U S010652432B2

United States Patent
Sato et al.

(10) Patent No.: US 10,652,432 B2
(45) Date of Patent: May 12, 2020

(54) IMAGE SCANNER

(71) Applicant: BROTHER KOGYO KABUSHIKI KAISHA, Nagoya-shi, Aichi-ken (JP)

(72) Inventors: Seiya Sato, Kuwana (JP); Takahiro Ikeno, Seto (JP)

(73) Assignee: BROTHER KOGYO KABUSHIKI KAISHA, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/451,710

(22) Filed: Jun. 25, 2019

(65) Prior Publication Data
US 2020/0014822 A1   Jan. 9, 2020

(30) Foreign Application Priority Data
Jul. 3, 2018   (JP) .................................. 2018-126585

(51) Int. Cl.
| H04N 1/40 | (2006.01) |
| H04N 1/60 | (2006.01) |
| H04N 1/48 | (2006.01) |
| H04N 1/191 | (2006.01) |

(52) U.S. Cl.
CPC ........... *H04N 1/6027* (2013.01); *H04N 1/191* (2013.01); *H04N 1/486* (2013.01); *H04N 1/6008* (2013.01); *H04N 1/6086* (2013.01)

(58) Field of Classification Search
CPC ...... H04N 1/6027; H04N 1/191; H04N 1/486; H04N 1/6008; H04N 1/6086

USPC ......................... 358/509, 505, 518, 3.26, 2.1
See application file for complete search history.

(56) References Cited

U.S. PATENT DOCUMENTS

| 2006/0023943 A1* | 2/2006 | Makino | .................... H04N 1/58 |
| | | | 382/167 |
| 2010/0188673 A1* | 7/2010 | Makino | .................... H04N 1/58 |
| | | | 358/1.9 |

FOREIGN PATENT DOCUMENTS

| JP | H04-280575 A | 10/1992 |
| JP | 2002-142122 A | 5/2002 |

* cited by examiner

*Primary Examiner* — Cheukfan Lee
(74) *Attorney, Agent, or Firm* — Scully, Scott, Murphy & Presser, P.C.

(57) ABSTRACT

An image scanner is configured to: while changing a reading position by a position changer and sequentially emitting light of each of three colors in a turn-on sequence from a light source to a document, control a line sensor to read reflection light of emitted light, thereby acquiring gradation image data including gradation values of three colors for each pixel in one line; determine whether a top color shift occurs in the gradation image data at a determination position; in response to determining that the top color shift occurs at the determination position, replace gradation image data at the determination position with black image data; determine whether a bottom color shift occurs in the gradation image data at the determination position; and in response to determining that the bottom color shift occurs at the determination position, replace gradation image data at the determination position with white image data.

10 Claims, 9 Drawing Sheets

FIG. 5A

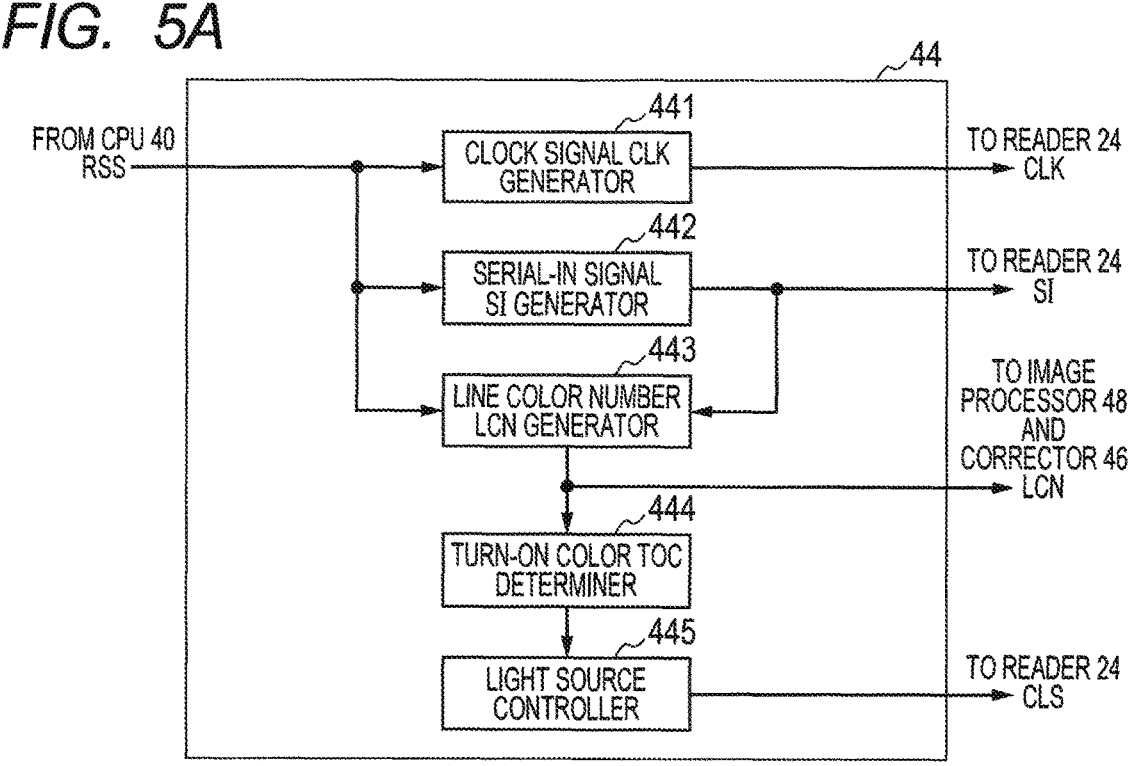

FIG. 5B

|  |  | TURN-ON SEQUENCE | | |
|---|---|---|---|---|
|  |  | FIRST TURN-ON COLOR TOC1 | SECOND TURN-ON COLOR TOC2 | THIRD TURN-ON COLOR TOC3 |
| FIRST LINE | LINE COLOR NUMBER LCN | 33 | 11 | 12 |
|  | TURN-ON COLOR TOC | GREEN (G) | BLUE (B) | RED (R) |
| SECOND LINE | LINE COLOR NUMBER LCN | 13 | 21 | 22 |
|  | TURN-ON COLOR TOC | BLUE (B) | RED (R) | GREEN (G) |
| THIRD LINE | LINE COLOR NUMBER LCN | 23 | 31 | 32 |
|  | TURN-ON COLOR TOC | RED (R) | GREEN (G) | BLUE (B) |

FIG. 5C

|  |  | OUTPUT SEQUENCE | | |
|---|---|---|---|---|
|  |  | FIRST OUTPUT COLOR OC1 | SECOND OUTPUT COLOR OC2 | THIRD OUTPUT COLOR OC3 |
| FIRST LINE | LINE COLOR NUMBER LCN | 11 | 12 | 13 |
|  | OUTPUT COLOR OC | GREEN (G) | BLUE (B) | RED (R) |
| SECOND LINE | LINE COLOR NUMBER LCN | 21 | 22 | 23 |
|  | OUTPUT COLOR OC | BLUE (B) | RED (R) | GREEN (G) |
| THIRD LINE | LINE COLOR NUMBER LCN | 31 | 32 | 33 |
|  | OUTPUT COLOR OC | RED (R) | GREEN (G) | BLUE (B) |

※ OUTPUT COLOR OC INDICATES COLOR OF GRADATION VALUE GV THAT IS OUTPUTTED BY READER 24.

IMAGE SCANNER

CROSS REFERENCE TO RELATED APPLICATIONS

This application claims priority from Japanese Patent Application No. 2018-126585 filed Jul. 3, 2018. The entire content of the priority application is incorporated herein by reference.

TECHNICAL FIELD

This disclosure relates to an image scanner.

BACKGROUND

An image scanner is generally known. The image scanner acquires line image data that is image data of one line of three colors including red, blue, and green by, while moving a reading position of a line sensor to the downstream side in the reading direction, emitting light while switching color of a light source of the three colors in a predetermined emitting sequence and reading an image.

In this image scanner, the reading positions of red, blue, and green differ by ⅓ for each color in the emitting sequence. In this image scanner, a case is considered in which the light source is controlled to emit light by switching the color of the light source in the emitting sequence in which green is the first color, blue is the second color, and red is the third color, for example. In this image scanner, in a case where the image at the reading position changes from a white background color image to a black image in the middle of emitting blue light, the white image is read when emitting green light that is the first color in the emitting sequence, and the black image is read when emitting red light that is the third color in the emitting sequence. Thus, green image data has a large output and red image data has a small output, and hence line image data of cyan or similar color is acquired. Further, in this image scanner, in a case where the image at the reading position changes from a black image to a white background color image in the middle of emitting blue light, the black image is read when emitting green light that is the first color in the emitting sequence, and the white image is read when emitting red light that is the third color in the emitting sequence. Thus, green image data has a small output and red image data has a large output, and hence line image data of magenta or similar color is acquired. In this way, in this image scanner, in a case of reading a boundary between a white background color image and a black image, images of different colors are read when light of the first color is emitted and when light of the third color is emitted, which may cause occurrence of a color shift. The color shift that occurs in the first color occurs because the reading position of the first color is shifted from the reading position of the second color by ⅓ line to the upstream side in the reading direction. The color shift that occurs in the third color occurs because the reading position of the third color is shifted from the reading position of the second color by ⅓ line to the downstream side in the reading direction.

In order to correct the color shift that occurs because the reading position of the first color is shifted from the reading position of the second color by ⅓ line to the upstream side in the reading direction or because the reading position of the third color is shifted from the reading position of the second color by ⅓ line to the downstream side in the reading direction, the above-mentioned image scanner generates image data of the first color of a certain line by using image data of the first color of the read line, image data of the first color of the line prior to the read line, and image data of the first color of the line subsequent to the read line, and further generates image data of the third color of the line by using image data of the third color of the read line, image data of the third color of the line prior to the read line, and image data of the third color of the line subsequent to the read line.

SUMMARY

According to one aspect, this specification discloses an image scanner. The image scanner includes a light source, a line sensor, a position changer, and a circuit. The light source is configured to emit light of each of three colors of red, blue, and green. The line sensor is configured to read an image, on a document, of one line along a first direction. The position changer is configured to change a reading position in a second direction perpendicular to the first direction. The reading position is a position of the image of one line that is read by the line sensor. The circuit is configured to: while changing the reading position by the position changer and sequentially emitting light of each of the three colors in a turn-on sequence from the light source to the document, control the line sensor to read reflection light of the emitted light, thereby acquiring gradation image data including gradation values of the three colors for each pixel in one line; determine whether a top color shift occurs in the gradation image data at a determination position that is a position of a particular pixel in one line, the top color shift being caused by a change of an image to be read, in the second direction, from a white image to a black image; in response to determining that the top color shift occurs at the determination position, replace gradation image data at the determination position with black image data; determine whether a bottom color shift occurs in the gradation image data at the determination position, the bottom color shift being caused by a change of an image to be read, in the second direction, from a black image to a white image; and in response to determining that the bottom color shift occurs at the determination position, replace gradation image data at the determination position with white image data.

According to another aspect, this specification also discloses an image scanner. The image scanner includes a light source, a light source controller, a line sensor, a position changer, a reader, a top color shift determiner, a top replacing unit, a bottom color shift determiner, and a bottom replacing unit. The light source is configured to emit light of each of three colors of red, blue, and green. The light source controller is configured to control the light source to sequentially emit light of each of the three colors in a turn-on sequence. The line sensor is configured to read an image, on a document, of one line along a first direction. The position changer is configured to change a reading position in a second direction perpendicular to the first direction. The reading position is a position of the image of one line that is read by the line sensor. The reader is configured to, while changing the reading position by the position changer and emitting light from the light source to the document in the turn-on sequence, cause the line sensor to read reflection light of the emitted light, thereby acquiring gradation image data including gradation values of the three colors for each pixel in one line. The top color shift determiner is configured to determine whether a top color shift occurs in the gradation image data at a determination position that is a position of a particular pixel in one line, the top color shift being caused by a change of an image to be read, in the second direction, from a white image to a black image. The top replacing unit is configured to, in response to determining that the top color shift occurs at the determination position, replace gradation image data at the determination position with black image data. The bottom color shift determiner is configured to determine whether a bottom color shift occurs in the gradation image data at the determination position, the bottom color shift being caused by a change of an image to be read, in the second direction, from a black image to a white image. The bottom replacing unit is configured to, in response to determining that the bottom color shift occurs at the determination position, replace gradation image data at the determination position with white image data.

BRIEF DESCRIPTION OF THE DRAWINGS

Embodiments in accordance with this disclosure will be described in detail with reference to the following figures wherein:

FIG. 5A is a block diagram showing an electrical configuration of a device controller;

FIG. 5B is a table for showing a first turn-on color TOC1, a second turn-on color TOC2, and a third turn-on color TOC3 in a first line, a second line, and a third line;

FIG. 5C is a table for showing a first output color OC1, a second output color OC2, and a third output color OC3 in the first line, the second line, and the third line;

DETAILED DESCRIPTION

The above-mentioned image scanner concurrently corrects the color shift that occurs because image data of the first color is shifted by ⅓ line and the color shift that occurs because image data of the third color is shifted by ⅓ line. However, the color shift that occurs because image data of the first color is shifted by ⅓ line and the color shift that occurs because image data of the third color is shifted by ⅓ line do not occur concurrently. This leads to a problem that, although image data of color having no color shift does not require color shift correction, color shift correction is performed by using image data of the same color of the previous and subsequent lines and the image becomes blurred.

In view of the foregoing, an example of an object of this disclosure is to provide an image scanner configured to determine each of two types of color shifts including a top color shift caused by a change of an image to be read from a white color image to a black color image and a bottom color shift caused by a change of an image to be read from a black color image to a white color image and to replace gradation image data depending on the type of the color shift, thereby suppressing the color shift.

Figure 1:
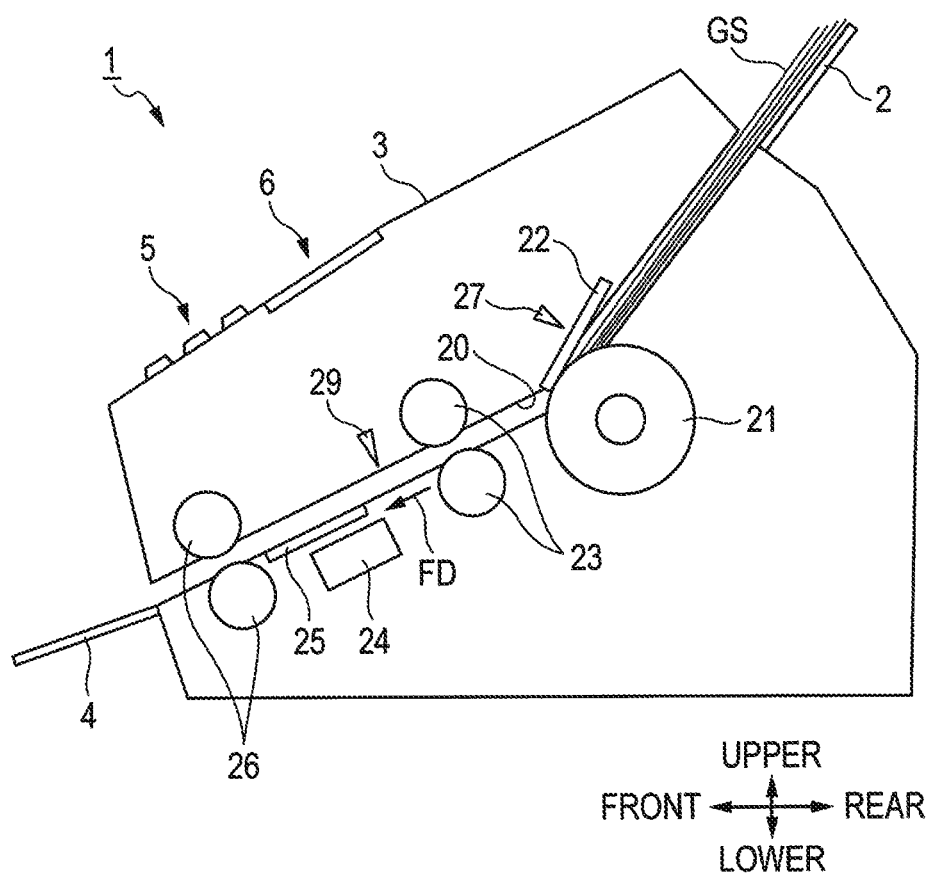
FIG. 1 is a schematic diagram showing an internal configuration of an image scanner.

An image scanner 1 according to an embodiment will be described while referring to the attached drawings. In FIG. 1, an upper-lower direction and a front-rear direction are indicated by the arrows. A conveyance direction FD (an example of a second direction) is indicated by the arrows in FIG. 1 and FIG. 2. A main scanning direction MD (an example of a first direction) is indicated by the arrow in FIG. 3.

<Mechanical Configuration of Image Scanner 1>

In FIG. 1, the image scanner 1 includes a paper feed tray 2, a main body 3, and a paper discharge tray 4. An operation interface 5 and a display 6 are disposed on an upper surface of the main body 3. The operation interface 5 includes a power switch and various setting buttons and receives an operation instruction and so on from a user. For example, the operation interface 5 includes a start button that instructs start of a reading operation (scan operation). The display 6 includes an LCD and displays the status of the image scanner 1. A document GS is placed on a support surface of the paper feed tray 2.

A conveyance path 20 is formed inside the main body 3. The document GS supported on the paper feed tray 2 is conveyed along the conveyance path 20 in the conveyance direction FD and discharged to the paper discharge tray 4. A paper feed roller 21, a separating pad 22, a pair of upstream-side conveyance rollers 23, a rear sensor 29, a reader 24, a platen glass 25, and a pair of downstream-side conveyance rollers 26 are disposed along the conveyance path 20.

The paper feed roller 21 cooperates with the separating pad 22 to feed a plurality of documents GS one sheet at a time. The paper feed roller 21, the upstream-side conveyance rollers 23, and the downstream-side conveyance rollers 26 are driven by a conveyance motor MT (see FIG. 4). The rear sensor 29 is provided between the upstream-side conveyance rollers 23 and the reader 24. The rear sensor 29 turns on when the document GS passes a position at which the rear sensor 29 is provided and turns off when the document GS does not pass the position at which the rear sensor 29 is provided. In this embodiment, the rear sensor 29 is disposed at a position separated from the reader 24 by a particular distance upstream in the conveyance direction FD. The platen glass 25 is transparent and is disposed along the conveyance path 20 at a lower side of the conveyance path 20. The conveyance rollers 23 and 26 convey the document GS fed from the paper feed roller 21 so that the document GS passes over the platen glass 25.

In this embodiment, the document GS is supported by the paper feed tray 2 so that a reading surface of the document GS faces the support surface of the paper feed tray 2. The reader 24 is disposed at the lower side of the conveyance path 20 and reads an image on the reading surface of the document GS that passes the platen glass 25. A front sensor 27 is provided at the paper feed tray 2. The front sensor 27 turns on when the document GS is supported by the paper feed tray 2 and turns off when the document GS is not supported by the paper feed tray 2.

<Detailed Configuration of Reader 24>

Figure 2:
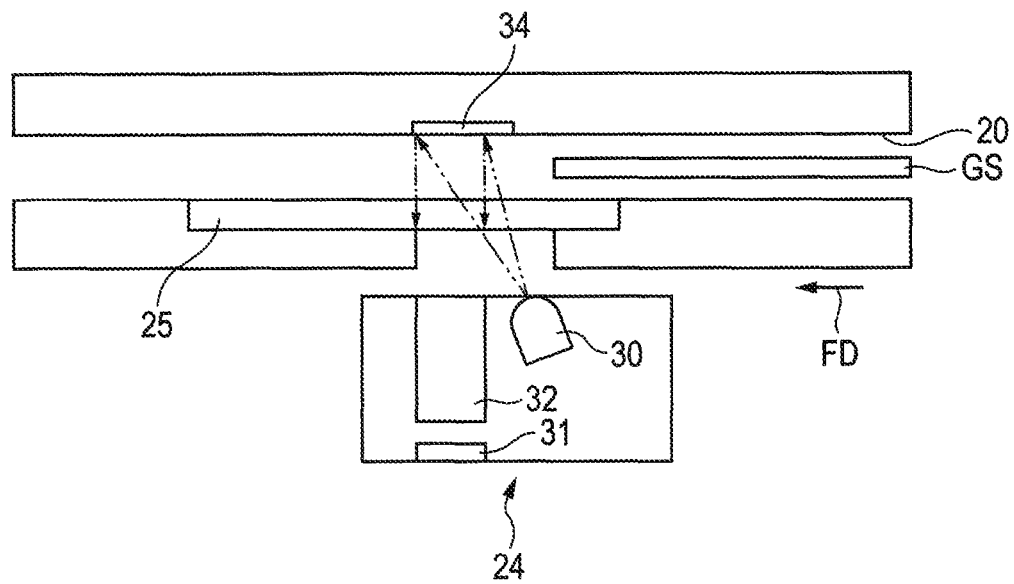
FIG. 2 is an enlarged view showing a configuration of a reader of the image scanner.

A detailed configuration of the reader 24 is described with reference to FIGS. 2 and 3. In FIG. 2, the reader 24 includes a light source 30, a light receiver 31, and a rod lens array 32. The light source 30 includes red, green and blue light emitting diodes. When light emitted from the light source 30, one color at a time, is reflected on the reading surface of the document GS and so on, the rod lens array 32 forms an image with the reflected light on the light receiver 31. In this embodiment, light emitting diodes of three colors are sequentially turned on so that an image of three colors of one line of the document GS is read. The light source 30 includes one-chip light emitting diode provided with the light emitting diodes of three colors and a light-guiding body that guides the light emitted from the light emitting diodes in the main scanning direction MD.

A white reference plate 34 is disposed at a position facing the reader 24 through the conveyance path 20. The white reference plate 34 has a reflectance equal to that of white color which is a background color of the document GS. When the document GS is not present on the conveyance path 20, the light emitted from the light source 30 is reflected on the white reference plate 34 and received by the light receiver 31 through the rod lens array 32.

Figure 3:
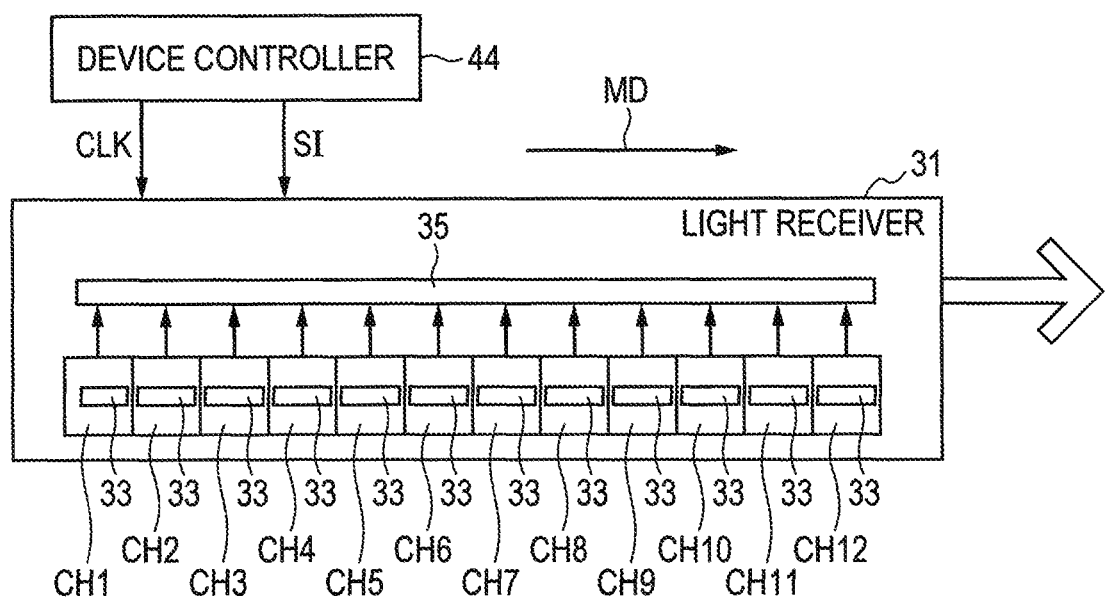
FIG. 3 is a block diagram showing a configuration of a light receiver of the reader.

In FIG. 3, the light receiver 31 includes twelve sensor IC chips CH1 to CH12 (hereinafter referred to as "chips CH1 to CH12") arranged linearly in the main scanning direction MD, and an analog shift register 35. Each of the chips CH1 to CH12 includes 2500 pieces of photoelectric conversion elements 33 arranged in the main scanning direction MD. The amount of light received by each photoelectric conversion element 33 is stored as charge and outputted to the analog shift register 35 as an electrical signal for each pixel. The analog shift register 35 is configured to store the same number of electrical signals for pixels as the number of photoelectric conversion elements 33. Each photoelectric conversion element 33 is connected to a corresponding register of the analog shift register 35. The electrical signals outputted from the analog shift register 35 are outputted as analog signals through an amplifier (not shown). An initial pixel is a pixel that is read by an initial element located at the end (at the side not adjacent to the chip CH2) of the chip CH1 located most upstream in the main scanning direction MD. A final pixel is a pixel that is read by a final element located at the end (at the side not adjacent to the chip CH11) of the chip CH12 located most downstream in the main scanning direction MD. One line is a group of pixels from the initial pixel to the final pixel. In this embodiment, the timing of an output color that the light receiver 31 outputs is shifted (delayed) by one line from the timing of a turn-on color that the light source 30 turns on. That is, the turn-on color that the light source 30 turns on is the same as the output color that the light receiver 31 outputs in the line subsequent to the line in which the light source 30 turns on with that turn-on color.

<Electrical Configuration of Image Scanner 1>

Figure 4:
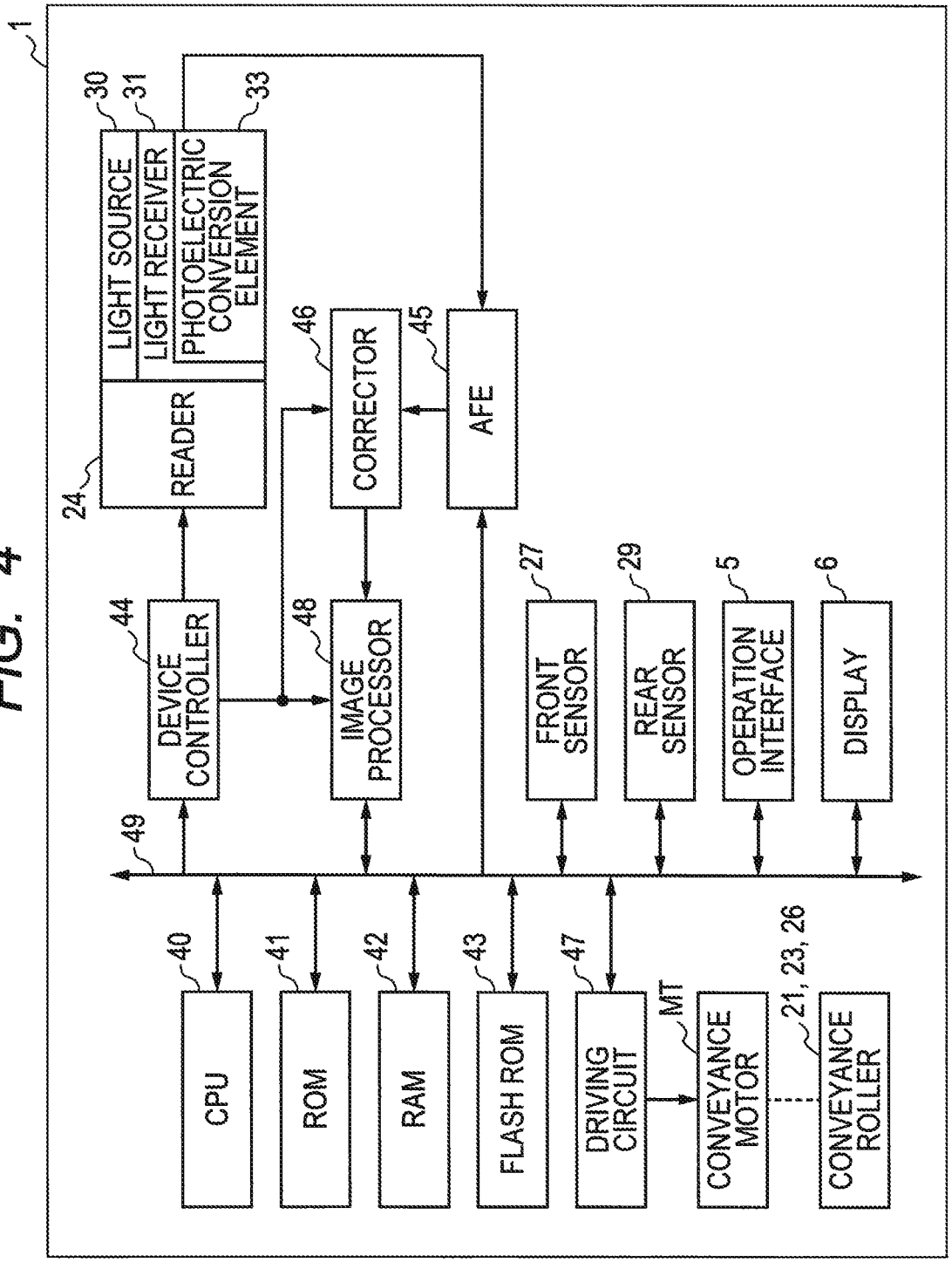
FIG. 4 is a block diagram showing an electrical configuration of the image scanner 1.

The electrical configuration of the image scanner 1 will be described with reference to FIGS. 4 to 8. In FIG. 4, the image scanner 1 includes, as main constituent elements, a CPU 40, a ROM 41, a RAM 42, a flash ROM 43, a device controller 44, an analog front end (hereinafter referred to as an AFE) 45, a corrector 46, an image processor 48, and a driving circuit 47. These constituent elements are connected to the operation interface 5, the display 6, the front sensor 27, and the rear sensor 29 through a bus 49. The operation interface 5 includes a plurality of keys such as a start button and a determination button (enter button). A user can input various instructions to the image scanner 1 by operating the operation interface 5. The display 6 displays various kinds of information.

The ROM 41 stores programs for allowing the image scanner 1 to execute various operations such as reading main processing described later. The CPU 40 controls the respective units in accordance with programs read out from the ROM 41. The flash ROM 43 is a reprogrammable nonvolatile memory, and stores various data used by control processing by the CPU 40, for example, various data that are used for initialization. The RAM 42 temporarily stores, for example, the calculation results generated by control processing by the CPU 40.

The driving circuit 47 is connected to a conveyance motor MT, and drives the conveyance motor MT based on a drive command transmitted from the CPU 40. The driving circuit 47 rotates the conveyance motor MT in accordance with a rotation amount and a rotation direction commanded by a drive command. When the conveyance motor MT rotates by a particular amount, the paper feed roller 21 and the conveyance rollers 23, 26 rotate by a particular angle to convey the document GS by a particular distance in the conveyance path 20.

As shown in FIG. 5A, the device controller 44 includes a clock signal CLK generator 441, a serial-in signal SI generator 442, a line color number LCN generator 443, a turn-on color TOC determiner 444, and a light source controller 445.

In response to receiving a reading start signal RSS from the CPU 40, the clock signal CLK generator 441 transmits, to the reader 24, a clock signal CLK for sequentially outputting an electric signal of each register of the analog shift register 35 from the leading pixel to the final pixel one pixel at a time.

In response to receiving the reading start signal RSS form the CPU 40, the serial-in signal SI generator 442 transmits, to the reader 24 and the line color number LCN generator 443, a serial-in signal SI for concurrently transferring electric signals of a large number of photoelectric conversion elements 33 of each chip CH1 to CH12 of the light receiver 31 to each register of the analog shift register 35.

In response to receiving the reading start signal RSS from the CPU 40 and receiving the serial-in signal SI from the serial-in signal SI generator 442, the line color number LCN generator 443 transmits "33" as a line color number LCN to the image processor 48, the corrector 46, and the turn-on color TOC determiner 444. In response to receiving the serial-in signal SI from the serial-in signal SI generator 442 after transmitting the line color number LCN of "33", the line color number LCN generator 443 transmits "11" as the line color number LCN to the image processor 48, the corrector 46, and the turn-on color TOC determiner 444. In response to receiving the serial-in signal SI from the serial-in signal SI generator 442 after transmitting the line color number LCN of "11", the line color number LCN generator 443 transmits "12" as the line color number LCN to the image processor 48, the corrector 46, and the turn-on color TOC determiner 444. In response to receiving the serial-in signal SI from the serial-in signal SI generator 442 after transmitting the line color number LCN of "12", the line color number LCN generator 443 transmits "13" as the line color number LCN to the image processor 48, the corrector 46, and the turn-on color TOC determiner 444. In response to receiving the serial-in signal SI from the serial-in signal SI generator 442 after transmitting the line color number LCN of "13", the line color number LCN generator 443 transmits "21" as the line color number LCN to the image processor 48, the corrector 46, and the turn-on color TOC determiner 444. In response to receiving the serial-in signal SI from the serial-in signal SI generator 442 after transmitting the line color number LCN of "21", the line color number LCN generator 443 transmits "22" as the line color number LCN to the image processor 48, the corrector 46, and the turn-on color TOC determiner 444. In response to receiving the serial-in signal SI from the serial-in signal SI generator 442 after transmitting the line color number LCN of "22", the line color number LCN generator 443 transmits "23" as the line color number LCN to the image processor 48, the corrector 46, and the turn-on color TOC determiner 444. In response to receiving the serial-in signal SI from the serial-in signal SI generator 442 after transmitting the line color number LCN of "23", the line color number LCN generator 443 transmits "31" as the line color number LCN to the image processor 48, the corrector 46, and the turn-on color TOC determiner 444. In response to receiving the serial-in signal SI from the serial-in signal SI generator 442 after transmitting the line color number LCN of "31", the line color number LCN generator 443 transmits "32" as the line color number LCN to the image processor 48, the corrector 46, and the turn-on color TOC determiner 444. In response to receiving the serial-in signal SI from the serial-in signal SI generator 442 after transmitting the line color number LCN of "32", the line color number LCN generator 443 transmits "33" as the line color number LCN to the image processor 48, the corrector 46, and the turn-on color TOC determiner 444. That is, every time the serial-in signal SI is inputted after the reading start signal RSS is inputted, the line color number LCN generator 443 repeatedly transmits the line color number LCN, in the sequence of "33", "11", "12", "13", "21", "22", "23", "31", "32", to the image processor 48, the corrector 46, and the turn-on color TOC determiner 444.

Here, as shown in FIG. 5C, when the line color number LCN is "11", "12", or "13", the reader 24 outputs the gradation value GV of each color of the first line. When the line color number LCN is "21", "22", or "23", the reader 24 outputs the gradation value GV of each color of the second line. When the line color number LCN is "31", "32", or "33", the reader 24 outputs the gradation value GV of each color of the third line.

As shown in FIG. 5B, in response to receiving the line color number LCN of "33" from the line color number LCN generator 443, the turn-on color TOC determiner 444 transmits, to the light source controller 445, green color that is the first turn-on color TOC1 of the first line as a turn-on color TOC. In response to receiving the line color number LCN of "11" from the line color number LCN generator 443, the turn-on color TOC determiner 444 transmits, to the light source controller 445, blue color that is the second turn-on color TOC2 of the first line as the turn-on color TOC. In response to receiving the line color number LCN of "12" from the line color number LCN generator 443, the turn-on color TOC determiner 444 transmits, to the light source controller 445, red color that is the third turn-on color TOC3 of the first line as the turn-on color TOC. In response to receiving the line color number LCN of "13" from the line color number LCN generator 443, the turn-on color TOC determiner 444 transmits, to the light source controller 445, blue color that is the first turn-on color TOC1 of the second line as the turn-on color TOC. In response to receiving the line color number LCN of "21" from the line color number LCN generator 443, the turn-on color TOC determiner 444 transmits, to the light source controller 445, red color that is the second turn-on color TOC2 of the second line as the turn-on color TOC. In response to receiving the line color number LCN of "22" from the line color number LCN generator 443, the turn-on color TOC determiner 444 transmits, to the light source controller 445, green color that is the third turn-on color TOC3 of the second line as the turn-on color TOC. In response to receiving the line color number LCN of "23" from the line color number LCN generator 443, the turn-on color TOC determiner 444 transmits, to the light source controller 445, red color that is the first turn-on color TOC1 of the third line as the turn-on color TOC. In response to receiving the line color number LCN of "31" from the line color number LCN generator 443, the turn-on color TOC determiner 444 transmits, to the light source controller 445, green color that is the second turn-on color TOC2 of the third line as the turn-on color TOC. In response to receiving the line color number LCN of "32" from the line color number LCN generator 443, the turn-on color TOC determiner 444 transmits, to the light source controller 445, blue color that is the third turn-on color TOC3 of the third line as the turn-on color TOC. In this embodiment, for the first line, the light source 30 turns on in the sequence of green color that is the first turn-on color TOC1, blue color that is the second turn-on color TOC2, and red color that is the third turn-on color TOC3. For the second line, the light source 30 turns on in the sequence of blue color that is the first turn-on color TOC1, red color that is the second turn-on color TOC2, and green color that is the third turn-on color TOC3. For the third line, the light source 30 turns on in the sequence of red color that is the first turn-on color TOC1, green color that is the second turn-on color TOC2, and blue color that is the third turn-on color TOC3.

In response to receiving the turn-on color TOC from the turn-on color TOC determiner 444, the light source controller 445 transmits, to the light source 30, a signal for controlling turning on and off of the light source 30 of the inputted turn-on color TOC and a signal for controlling a value of electric current that flows through the light source 30 of the inputted turn-on color TOC.

As shown in FIG. 4, in response to receiving these control signals from the device controller 44, the reader 24 turns on the light source 30 of the turn-on color TOC and transmits, to the AFE 45, an analog signal corresponding to the amount of light received by the light receiver 31.

The AFE 45 is connected to the reader 24 and, based on instructions from the CPU 40, converts analog signals transmitted from the reader 24 into digital data. The AFE 45 has a particular input range and resolution. For example, if the resolution is eight bits, the resolution corresponds to gradations of "0" to "255". In this case, the AFE 45 converts the analog signal transmitted from the reader 24 into gradation data of eight bits (0 to 255) as digital data. The digital data converted by the AFE 45 is transmitted to the corrector 46.

The corrector 46 performs various kinds of image processing on digital data. The image processing is correction processing such as shading correction and gamma correction. The corrector 46 performs image processing on digital data, generates gradation values GV, and transmits the gradation values GV to the image processor 48. In this embodiment, gamma correction has been performed on the gradation values GV such that the degree of change from "0" indicative of black color to "255" indicative of white color is consistent with visual characteristics of a man. The corrector 46 performs gamma correction processing after shading correction processing is performed based on shading correction data of the output color OC corresponding to the line color number LCN inputted to the corrector 46. The shading correction data of red color, green color, and blue color are preliminarily stored in the flash ROM 43.

Figure 6:
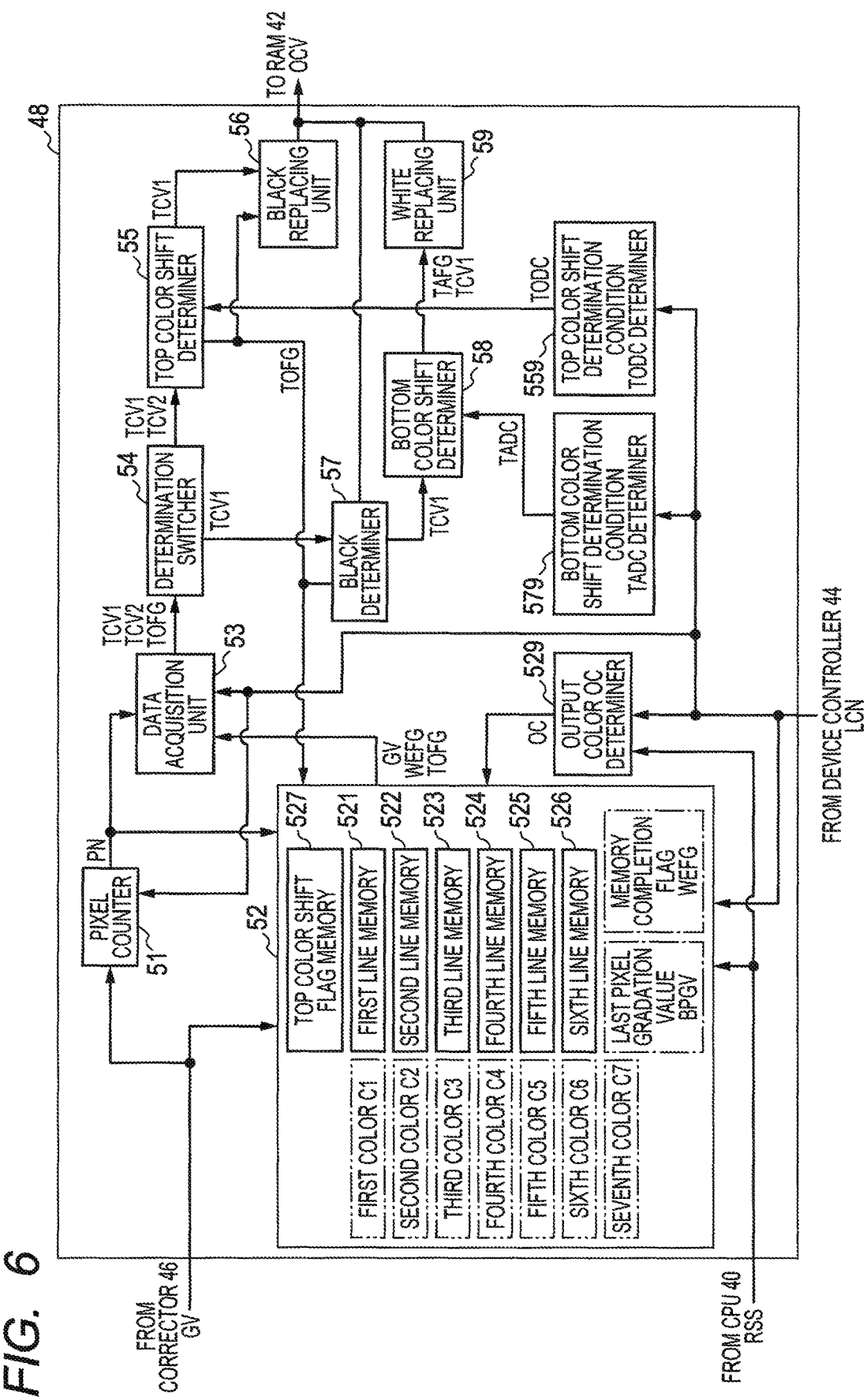
FIG. 6 is a block diagram showing an electrical configuration of an image processor.

As shown in FIG. 6, the image processor 48 includes a pixel counter 51, a data memory 52, a data acquisition unit 53, a determination switcher 54, a top color shift determiner 55, a black replacing unit 56, a black determiner 57, a bottom color shift determiner 58, a white replacing unit 59, an output color OC determiner 529, a bottom color shift determination condition TADC determiner 579, and a top color shift determination condition TODC determiner 559.

In response to receiving the line color number LCN from the device controller 44, the pixel counter 51 sets "0" to a pixel number PN. In response to receiving the gradation value GV from the corrector 46, the pixel counter 51 adds "1" to the pixel number PN and transmits the incremented pixel number PN to the data acquisition unit 53 and the data memory 52.

In response to receiving the reading start signal RSS from the CPU 40 and receiving the line color number LCN from the device controller 44 for the first time, the output color OC determiner 529 stands by without transmitting the output color OC. That is, the output color OC determiner 529 does not transmit the output color OC even when the reading start signal RSS is received and the line color number LCN of "33" is received for the first time. As shown in FIG. 5C, in response to receiving the line color number LCN of "11" from the device controller 44, the output color OC determiner 529 transmits, to the data memory 52, green color that is the first output color OC1 of the first line as the output color OC. In response to receiving the line color number LCN of "12" from the device controller 44, the output color OC determiner 529 transmits, to the data memory 52, blue color that is the second output color OC2 of the first line as the output color OC. In response to receiving the line color number LCN of "13" from the device controller 44, the output color OC determiner 529 transmits, to the data memory 52, red color that is the third output color OC3 of the first line as the output color OC. In response to receiving the line color number LCN of "21" from the device controller 44, the output color OC determiner 529 transmits, to the data memory 52, blue color that is the first output color OC1 of the second line as the output color OC. In response to receiving the line color number LCN of "22" from the device controller 44, the output color OC determiner 529 transmits, to the data memory 52, red color that is the second output color OC2 of the second line as the output color OC. In response to receiving the line color number LCN of "23" from the device controller 44, the output color OC determiner 529 transmits, to the data memory 52, green color that is the third output color OC3 of the second line as the output color OC. In response to receiving the line color number LCN of "31" from the device controller 44, the output color OC determiner 529 transmits, to the data memory 52, red color that is the first output color OC1 of the third line as the output color OC. In response to receiving the line color number LCN of "32" from the device controller 44, the output color OC determiner 529 transmits, to the data memory 52, green color that is the second output color OC2 of the third line as the output color OC. In response to receiving the line color number LCN of "33" from the device controller 44, the output color OC determiner 529 transmits, to the data memory 52, blue color that is the third output color OC3 of the third line as the output color OC. In this embodiment, for the first line, the corrector 46 transmits gradation values GV in the sequence of green color that is the first output color OC1, blue color that is the second output color OC2, and red color that is the third output color OC3. For the second line, the corrector 46 transmits gradation values GV in the sequence of blue color that is the first output color OC1, red color that is the second output color OC2, and green color that is the third output color OC3. For the third line, the corrector 46 transmits gradation values GV in the sequence of red color that is the first output color OC1, green color that is the second output color OC2, and blue color that is the third output color OC3.

The data memory 52 includes a top color shift flag memory 527, a first line memory 521, a second line memory 522, a third line memory 523, a fourth line memory 524, a fifth line memory 525, and a sixth line memory 526. Each of the first line memory 521, the second line memory 522, the third line memory 523, the fourth line memory 524, the fifth line memory 525, and the sixth line memory 526 stores the gradation value GV of each pixel from "1" that is the pixel number PN of the leading pixel to "2500" that is the pixel number PN of the final pixel. The top color shift flag memory 527 stores a top color shift flag TOFG of each pixel from "1" that is the pixel number PN of the leading pixel to "2500" that is the pixel number PN of the final pixel.

Figure 8:
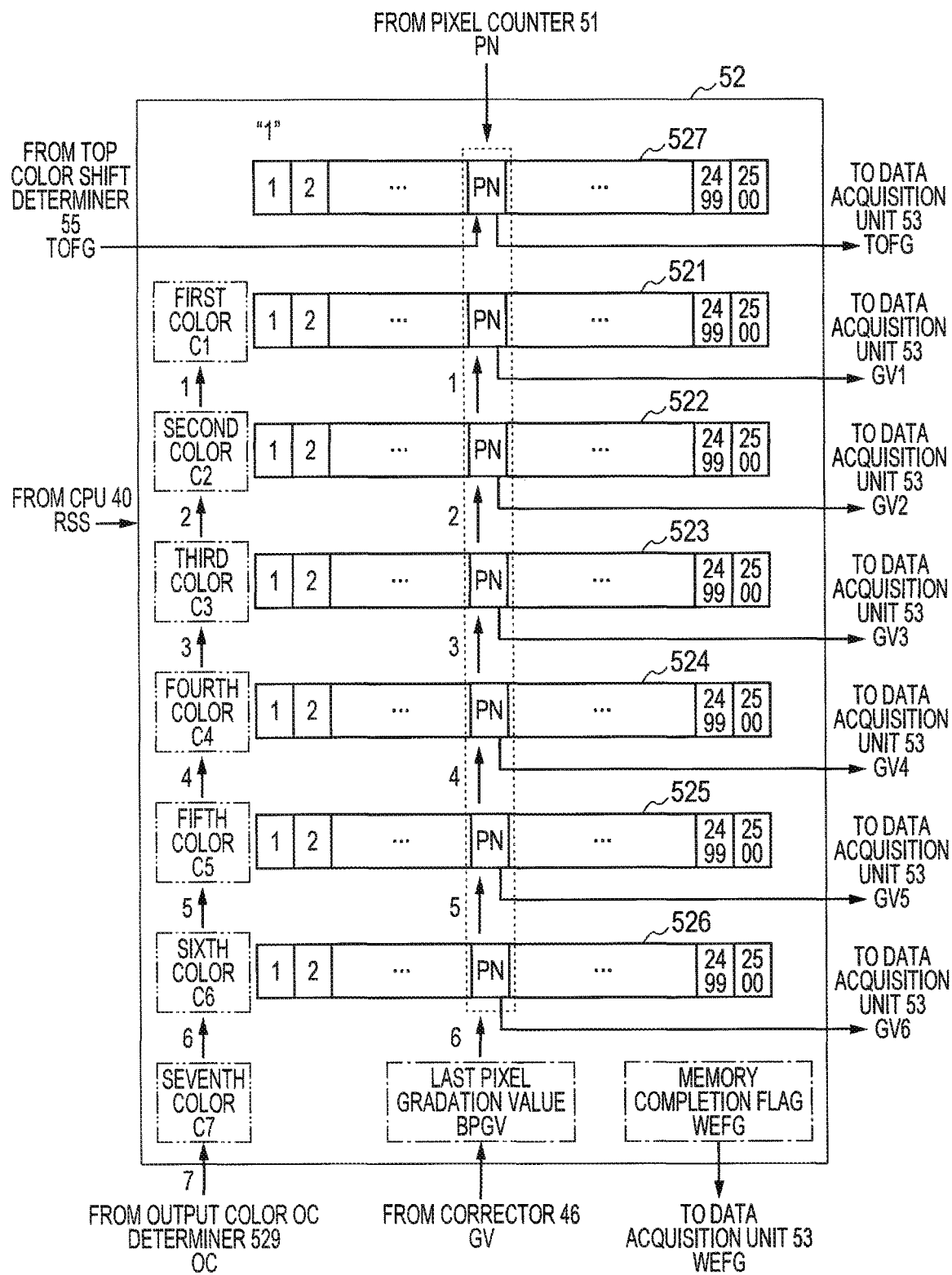
FIG. 8 is a block diagram showing an electrical configuration of a data memory.

As shown in FIG. 8, in response to receiving the reading start signal RSS from the CPU 40, the data memory 52 turns off the top color shift flag TOFG of all the pixels in the top color shift flag memory 527, turns off a memory completion flag WEFG, deletes a first color C1, a second color C2, a third color C3, a fourth color C4, a fifth color C5, a sixth color C6, and a seventh color C7, and deletes a last pixel gradation value BPGV. In response to receiving the output color OC from the output color OC determiner 529, for the pixel number PN inputted from the pixel counter 51 and the gradation value GV inputted from the corrector 46, the data memory 52 stores, in the first line memory 521, the gradation values GV of pixels from "1" that is the pixel number PN of the leading pixel to "2500" that is the pixel number PN of the final pixel in association with the pixel number PN, and stores, as the first color C1, the output color OC received from the output color OC determiner 529 in association with the first line memory 521. In response to receiving the output color OC from the output color OC determiner 529, for the pixel number PN inputted from the pixel counter 51 and the gradation value GV inputted from the corrector 46, the data memory 52 stores, in the second line memory 522, the gradation values GV of pixels from the pixel number PN "1" to "2500" in association with the pixel number PN, and stores, as the second color C2, the output color OC received from the output color OC determiner 529 in association with the second line memory 522. In response to receiving the output color OC from the output color OC determiner 529, for the pixel number PN inputted from the pixel counter 51 and the gradation value GV inputted from the corrector 46, the data memory 52 stores, in the third line memory 523, the gradation values GV of pixels from the pixel number PN "1" to "2500" in association with the pixel number PN, and stores, as the third color C3, the output color OC received from the output color OC determiner 529 in association with the third line memory 523. In response to receiving the output color OC from the output color OC determiner 529, for the pixel number PN inputted from the pixel counter 51 and the gradation value GV inputted from the corrector 46, the data memory 52 stores, in the fourth line memory 524, the gradation values GV of pixels from the pixel number PN "1" to "2500" in association with the pixel number PN, and stores, as the fourth color C4, the output color OC received from the output color OC determiner 529 in association with the fourth line memory 524. In response to receiving the output color OC from the output color OC determiner 529, for the pixel number PN inputted from the pixel counter 51 and the gradation value GV inputted from the corrector 46, the data memory 52 stores, in the fifth line memory 525, the gradation values GV of pixels from the pixel number PN "1" to "2500" in association with the pixel number PN, and stores, as the fifth color C5, the output color OC received from the output color OC determiner 529 in association with the fifth line memory 525. In response to receiving the output color OC from the output color OC determiner 529, for the pixel number PN inputted from the pixel counter 51 and the gradation value GV inputted from the corrector 46, the data memory 52 stores, in the sixth line memory 526, the gradation values GV of pixels from the pixel number PN "1" to "2500" in association with the pixel number PN, stores, as the sixth color C6, the output color OC received from the output color OC determiner 529 in association with the sixth line memory 526, turns on the memory completion flag WEFG, and transmits the turned-on memory completion flag WEFG to the data acquisition unit 53.

As shown in FIGS. 6 and 8, in response to receiving the line color number LCN of "11", "21", or "31" from the device controller 44 after the data acquisition unit 53 receives the turned-on memory completion flag WEFG from the data memory 52, the data acquisition unit 53 acquires, from the top color shift flag memory 527, the top color shift flag TOFG of the pixel number PN inputted from the pixel counter 51, acquires, from the first line memory 521, the gradation value GV of the pixel number PN inputted from the pixel counter 51 as a first gradation value GV1, acquires, from the second line memory 522, the gradation value GV of the pixel number PN inputted from the pixel counter 51 as a second gradation value GV2, acquires, from the third line memory 523, the gradation value GV of the pixel number PN inputted from the pixel counter 51 as a third gradation value GV3, acquires, from the fourth line memory 524, the gradation value GV of the pixel number PN inputted from the pixel counter 51 as a fourth gradation value GV4, acquires, from the fifth line memory 525, the gradation value GV of the pixel number PN inputted from the pixel counter 51 as a fifth gradation value GV5, acquires, from the sixth line memory 526, the gradation value GV of the pixel number PN inputted from the pixel counter 51 as a sixth gradation value GV6, and acquires the first color C1 associated with the first line memory 521, the second color C2 associated with the second line memory 522, the third color C3 associated with the third line memory 523, the fourth color C4 associated with the fourth line memory 524, the fifth color C5 associated with the fifth line memory 525, and the sixth color C6 associated with the sixth line memory 526. In response to acquiring the top color shift flag TOFG from the data memory 52, the data acquisition unit 53 transmits the acquired top color shift flag TOFG to the determination switcher 54. In response to acquiring the first gradation value GV1, the second gradation value GV2, the third gradation value GV3, the first color C1, the second color C2, and the third color C3 from the data memory 52, the data acquisition unit 53 transmits, to the determination switcher 54, the first gradation value GV1 and the first color C1 associated with the first gradation value GV1, the second gradation value GV2 and the second color C2 associated with the second gradation value GV2, the third gradation value GV3 and the third color C3 associated with the third gradation value GV3 as second target color values TCV2 that are the gradation values GV of red color, green color, and blue color. Here, the second target color value TCV2 of red color is one of the first gradation value GV1, the second gradation value GV2, and the third gradation value GV3 that is associated with red color among the first color C1, the second color C2, and the third color C3. The second target color value TCV2 of green color is one of the first gradation value GV1, the second gradation value GV2, and the third gradation value GV3 that is associated with green color among the first color C1, the second color C2, and the third color C3. The second target color value TCV2 of blue color is one of the first gradation value GV1, the second gradation value GV2, and the third gradation value GV3 that is associated with blue color among the first color C1, the second color C2, and the third color C3. In response to acquiring the fourth gradation value GV4, the fifth gradation value GV5, the sixth gradation value GV6, the fourth color C4, the fifth color C5, and the sixth color C6 from the data memory 52, the data acquisition unit 53 transmits, to the determination switcher 54, the fourth gradation value GV4 and the fourth color C4 associated with the fourth gradation value GV4, the fifth gradation value GV5 and the fifth color C5 associated with the fifth gradation value GV5, the sixth gradation value GV6 and the sixth color C6 associated with the sixth gradation value GV6 as first target color values TCV1 that are the gradation values GV of red color, green color, and blue color. Here, the first target color value TCV1 of red color is one of the fourth gradation value GV4, the fifth gradation value GV5, and the sixth gradation value GV6 that is associated with red color among the fourth color C4, the fifth color C5, and the sixth color C6. The first target color value TCV1 of green color is one of the fourth gradation value GV4, the fifth gradation value GV5, and the sixth gradation value GV6 that is associated with green color among the fourth color C4, the fifth color C5, and the sixth color C6. The first target color value TCV1 of blue color is one of the fourth gradation value GV4, the fifth gradation value GV5, and the sixth gradation value GV6 that is associated with blue color among the fourth color C4, the fifth color C5, and the sixth color C6.

As shown in FIG. 8, in response to receiving the gradation value GV from the corrector 46 when the memory completion flag WEFG is ON, the data memory 52 stores the received gradation value GV as the last pixel gradation value BPGV.

In response to receiving the output color OC from the output color OC determiner 529 when the memory completion flag WEFG is ON and the seventh color C7 is not stored, the data memory 52 stores the received output color OC as the seventh color C7. In response to receiving the output color OC from the output color OC determiner 529 when the memory completion flag WEFG is ON and the seventh color C7 is stored, the data memory 52 stores the second color C2 as the first color C1, stores the third color C3 as the second color C2, stores the fourth color C4 as the third color C3, stores the fifth color C5 as the fourth color C4, stores the sixth color C6 as the fifth color C5, stores the seventh color C7 as the sixth color C6, and stores the received output color OC as the seventh color C7.

In response to receiving the top color shift flag TOFG from the top color shift determiner 55 or the black determiner 57 described later when the memory completion flag WEFG is ON, the data memory 52 stores the color shift flag TOFG received from the top color shift determiner 55 or the black determiner 57 described later, as the top color shift flag TOFG in the top color shift flag memory 527 of the pixel number PN inputted from the pixel counter 51.

When the data acquisition unit 53 acquires the top color shift flag TOFG, the first gradation value GV1, the second gradation value GV2, the third gradation value GV3, the fourth gradation value GV4, the fifth gradation value GV5, and the sixth gradation value GV6 after the data memory 52 receives the line color number LCN of "11", "21", or "31" when the memory completion flag WEFG is ON, the data memory 52 stores the gradation value GV in the second line memory 522 of the pixel number PN inputted from the pixel counter 51 as the gradation value GV in the first line memory 521 of the pixel number PN inputted from the pixel counter 51, stores the gradation value GV in the third line memory 523 of the inputted pixel number PN as the gradation value GV in the second line memory 522 of the inputted pixel number PN, stores the gradation value GV in the fourth line memory 524 of the inputted pixel number PN as the gradation value GV in the third line memory 523 of the inputted pixel number PN, stores the gradation value GV in the fifth line memory 525 of the inputted pixel number PN as the gradation value GV in the fourth line memory 524 of the inputted pixel number PN, stores the gradation value GV in the sixth line memory 526 of the inputted pixel number PN as the gradation value GV in the fifth line memory 525 of the inputted pixel number PN, and stores the last pixel gradation value BPGV as the gradation value GV in the sixth line memory 526 of the inputted pixel number PN.

In response to receiving the pixel number PN after the data memory 52 receives the line color number LCN of "12", "13", "22", "23", "32", or "33" when the memory completion flag WEFG is ON, the data memory 52 stores the gradation value GV in the second line memory 522 of the inputted pixel number PN as the gradation value GV in the first line memory 521 of the inputted pixel number PN, stores the gradation value GV in the third line memory 523 of the inputted pixel number PN as the gradation value GV in the second line memory 522 of the inputted pixel number PN, stores the gradation value GV in the fourth line memory 524 of the inputted pixel number PN as the gradation value GV in the third line memory 523 of the inputted pixel number PN, stores the gradation value GV in the fifth line memory 525 of the inputted pixel number PN as the gradation value GV in the fourth line memory 524 of the inputted pixel number PN, stores the gradation value GV in the sixth line memory 526 of the inputted pixel number PN as the gradation value GV in the fifth line memory 525 of the inputted pixel number PN, and stores the last pixel gradation value BPGV as the gradation value GV in the sixth line memory 526 of the inputted pixel number PN.

As shown in FIG. 6, in response to receiving the first target color value TCV1, the second target color value TCV2, and the top color shift flag TOFG from the data acquisition unit 53, the determination switcher 54 determines whether the top color shift flag TOFG is ON. In response to determining that the top color shift flag TOFG is not ON, the determination switcher 54 transmits the first target color value TCV1 and the second target color value TCV2 to the top color shift determiner 55. In response to determining that the top color shift flag TOFG is ON, the determination switcher 54 transmits the first target color value TCV1 to the black determiner 57.

In response to receiving the line color number LCN of "11" from the device controller 44, the top color shift determination condition TODC determiner 559 transmits, to the top color shift determiner 55, a top color shift determination condition TODC that the gradation value GV of red color that is the first output color OC1 of the third line is larger than or equal to a first particular value and that the gradation value GV of blue color that is the third output color OC3 of the third line is smaller than or equal to a second particular value. In response to receiving the line color number LCN of "21" from the device controller 44, the top color shift determination condition TODC determiner 559 transmits, to the top color shift determiner 55, the top color shift determination condition TODC that the gradation value GV of green color that is the first output color OC1 of the first line is larger than or equal to the first particular value and that the gradation value GV of red color that is the third output color OC3 of the first line is smaller than or equal to the second particular value. In response to receiving the line color number LCN of "31" from the device controller 44, the top color shift determination condition TODC determiner 559 transmits, to the top color shift determiner 55, the top color shift determination condition TODC that the gradation value GV of blue color that is the first output color OC1 of the second line is larger than or equal to the first particular value and that the gradation value GV of green color that is the third output color OC3 of the second line is smaller than or equal to the second particular value. In this embodiment, the first particular value is the gradation value GV when color close to white color is read, and is "224", for example. The first particular value is the gradation value GV when reading an image of an intermediate color between white color and gray color of "192" that is a higher limit value of values from "64" to "192" that are normally deemed as gray color. The second particular value is the gradation value GV when gray color close to black is read, and is "64", for example. The second particular value is the gradation value GV when reading an image of an intermediate color between black color and gray color of "128" that is an intermediate color between white color and black color.

Figure 7:
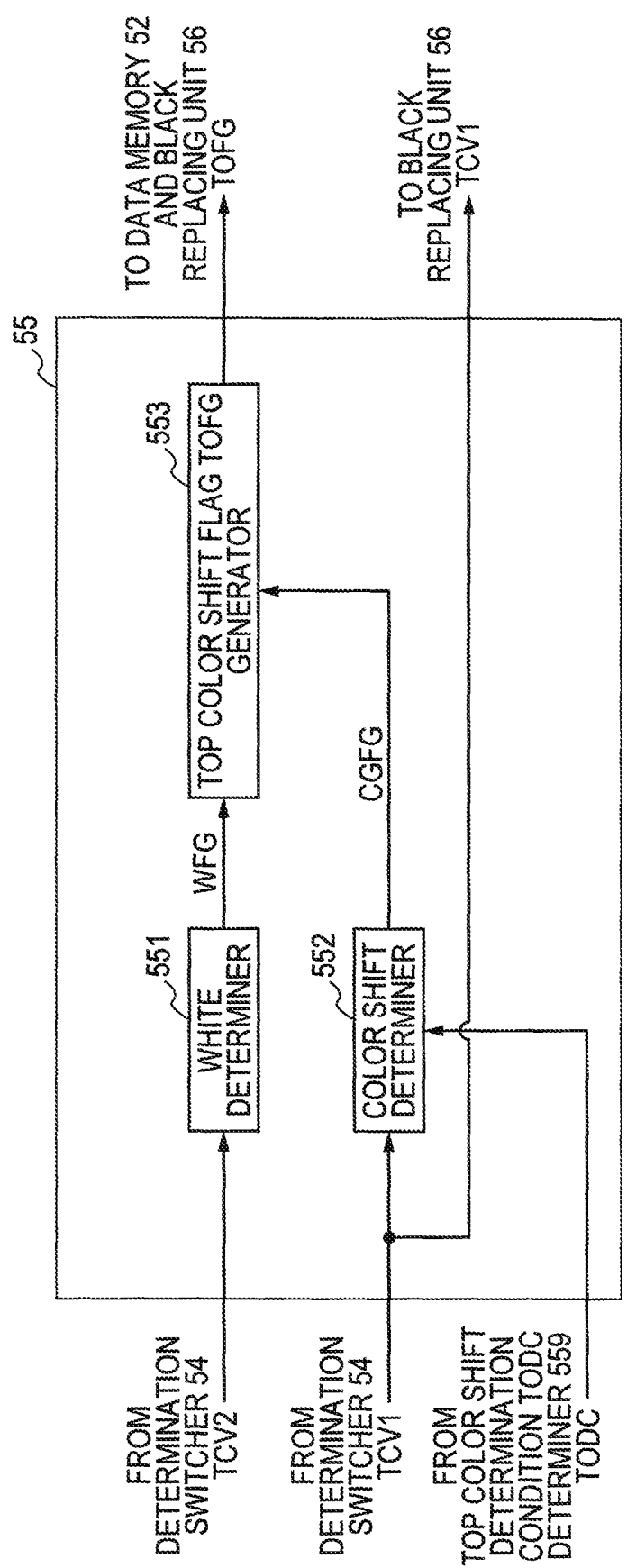
FIG. 7 is a block diagram showing an electrical configuration of a top color shift determiner.

As shown in FIG. 7, the top color shift determiner 55 includes a white determiner 551, a color shift determiner 552, and a top color shift flag TOFG generator 553. In response to receiving the first target color value TCV1 from the determination switcher 54, the top color shift determiner 55 transmits the first target color value TCV1 to the black replacing unit 56.

In response to receiving the second target color value TCV2 from the determination switcher 54, the white determiner 551 determines whether the second target color value TCV2 indicates white color. In response to determining that the second target color value TCV2 indicates white color, the white determiner 551 turns on the white flag WFG and transmits the white flag WFG to the top color shift flag TOFG generator 553. In response to determining that the second target color value TCV2 does not indicate white color, the white determiner 551 turns off the white flag WFG and transmits the white flag WFG to the top color shift flag TOFG generator 553. In this embodiment, as to determination of whether the second target color value TCV2 is a value indicative of white color, it is determined that the second target color value TCV2 indicates white color when all the gradation values GV of red, blue, and green in the second target color value TCV2 are larger than or equal to "224", and it is determined that the second target color value TCV2 does not indicate white color when any one of the gradation values GV of red, blue, and green in the second target color value TCV2 is smaller than "224".

In response to receiving the first target color value TCV1 from the determination switcher 54, the color shift determiner 552 determines whether the first target color value TCV1 satisfies the top color shift determination condition TODC that is inputted from the top color shift determination condition TODC determiner 559. In response to determining that the first target color value TCV1 satisfies the top color shift determination condition TODC, the color shift determiner 552 turns on a color shift flag CGFG and transmits the color shift flag CGFG to the top color shift flag TOFG generator 553. In response to determining that the first target color value TCV1 does not satisfy the top color shift determination condition TODC, the color shift determiner 552 turns off the color shift flag CGFG and transmits the color shift flag CGFG to the top color shift flag TOFG generator 553.

In response to receiving the white flag WFG from the white determiner 551 and receiving the color shift flag CGFG from the color shift determiner 552, the top color shift flag TOFG generator 553 determines whether the white flag WFG is ON and the color shift flag CGFG is ON. In response to determining that the white flag WFG is ON and the color shift flag CGFG is ON, the top color shift flag TOFG generator 553 turns on the top color shift flag TOFG and transmits the top color shift flag TOFG to the data memory 52 and the black replacing unit 56. In response to determining that the white flag WFG is OFF or the color shift flag CGFG is OFF, the top color shift flag TOFG generator 553 turns off the top color shift flag TOFG and transmits the top color shift flag TOFG to the data memory 52 and the black replacing unit 56. When the top color shift flag TOFG generator 553 transmits the top color shift flag TOFG to the data memory 52, the determination switcher 54 transmits the first target color value TCV1 and the second target color value TCV2 of the line of next three colors of the same pixel position to the transmission destination depending on the transmitted top color shift flag TOFG. That is, when the top color shift flag TOFG is not ON, the determination switcher 54 transmits the target color values TCV1 and TCV2 to the top color shift determiner 55. When the top color shift flag TOFG is ON, the determination switcher 54 transmits the first target color value TCV1 to the black determiner 57. In this embodiment, in a case where the white flag WFG is ON and the color shift flag CGFG is ON, the image processor 48 determines that top color shift occurs at the first target color value TCV1. The top color shift is color shift that occurs in a situation in which, when reading a boundary between a white background color image of the document GS and a black color image, the white color image is read by the first turn-on color TOC1 and the black color image is read by the third turn-on color TOC3 in the same line.

As shown in FIG. 6, in response to receiving the first target color value TCV1 and the top color shift flag TOFG from the top color shift determiner 55, and when the received top color shift flag TOFG is ON, the black replacing unit 56 stores, in the RAM 42, values indicative of black color in which all the gradation values GV of red, blue, and green are "0", as an output color value OCV. In response to receiving the first target color value TCV1 and the top color shift flag TOFG from the top color shift determiner 55, and when the received top color shift flag TOFG is OFF, the black replacing unit 56 stores, in the RAM 42, the first target color value TCV1 as the output color value OCV.

Next, the black determiner 57 will be described while referring to FIG. 6. In response to receiving the first target color value TCV1 from the determination switcher 54, the black determiner 57 determines whether the first target color value TCV1 indicates black color. In response to determining that the first target color value TCV1 indicates black color, the black determiner 57 stores the first target color value TCV1 as the output color value OCV in the RAM 42. In response to determining that the first target color value TCV1 does not indicate black color, the black determiner 57 transmits the first target color value TCV1 to the bottom color shift determiner 58, and turns off the top color shift flag TOFG and transmits the top color shift flag TOFG to the data memory 52. In this embodiment, regarding determination as to whether the first target color value TCV1 indicates black color, it is determined that the first target color value TCV1 indicates black color when all the gradation values GV of red, blue, and green of the first target color value TCV1 are smaller than or equal to "32", and it is determined that the first target color value TCV1 does not indicate black color when at least one of the gradation values GV of red, blue, and green of the first target color value TCV1 is larger than "32".

In response to receiving the line color number LCN of "11" from the device controller 44, the bottom color shift determination condition TADC determiner 579 transmits, to the bottom color shift determiner 58, a bottom color shift determination condition TADC that the gradation value GV of red color that is the first output color OC1 of the third line is smaller than or equal to the second particular value and the gradation value GV of blue color that is the third output color OC3 of the third line is larger than or equal to the first particular value. In response to receiving the line color number LCN of "21" from the device controller 44, the bottom color shift determination condition TADC determiner 579 transmits, to the bottom color shift determiner 58, the bottom color shift determination condition TADC that the gradation value GV of green color that is the first output color OC1 of the first line is smaller than or equal to the second particular value and the gradation value GV of red color that is the third output color OC3 of the first line is larger than or equal to the first particular value. In response to receiving the line color number LCN of "31" from the device controller 44, the bottom color shift determination condition TADC determiner 579 transmits, to the bottom color shift determiner 58, the bottom color shift determination condition TADC that the gradation value GV of blue color that is the first output color OC1 of the second line is smaller than or equal to the second particular value and the gradation value GV of green color that is the third output color OC3 of the second line is larger than or equal to the first particular value.

In response to receiving the first target color value TCV1 from the black determiner 57, the bottom color shift determiner 58 determines whether the first target color value TCV1 satisfies the bottom color shift determination condition TADC inputted from the bottom color shift determination condition TADC determiner 579. In response to determining that the first target color value TCV1 satisfies the bottom color shift determination condition TADC, the bottom color shift determiner 58 turns on a bottom color shift flag TAFG and transmits the bottom color shift flag TAFG to the white replacing unit 59, and also transmits the first target color value TCV1 to the white replacing unit 59. In response to determining that the first target color value TCV1 does not satisfy the bottom color shift determination condition TADC, the bottom color shift determiner 58 turns off the bottom color shift flag TAFG and transmits the bottom color shift flag TAFG to the white replacing unit 59, and also transmits the first target color value TCV1 to the white replacing unit 59. In this embodiment, the image processor 48 determines that bottom color shift occurs at the first target color value TCV1 when the first target color value TCV1 satisfies the bottom color shift determination condition TADC. The bottom color shift is color shift that occurs in a situation in which, when reading a boundary between a white background color image of the document GS and a black color image, the black color image is read by the first turn-on color TOC1 and the white color image is read by the third turn-on color TOC3 in the same line. Thus, in a document GS having white color as background color, bottom color shift occurs only after top color shift occurs.

In response to receiving the bottom color shift flag TAFG and the first target color value TCV1 from the bottom color shift determiner 58, the white replacing unit 59 determines whether the bottom color shift flag TAFG is ON. In response to determining that the bottom color shift flag TAFG is ON, the white replacing unit 59 stores, in the RAM 42, a value indicative of white color in which all the gradation values GV of red, blue, and green are "255", as the output color value OCV. In response to determining that the bottom color shift flag TAFG is OFF, the white replacing unit 59 stores the first target color value TCV1 in the RAM 42 as the output color value OCV.

<Operations of Image Scanner 1>

Next, operations of the image scanner 1 will be described while referring to the drawings. The image scanner 1 mainly executes reading main processing of reading a document GS. Processing R1 to processing R7 in the reading main processing are executed by the CPU 40.

<Reading Main Processing>

Figure 9:
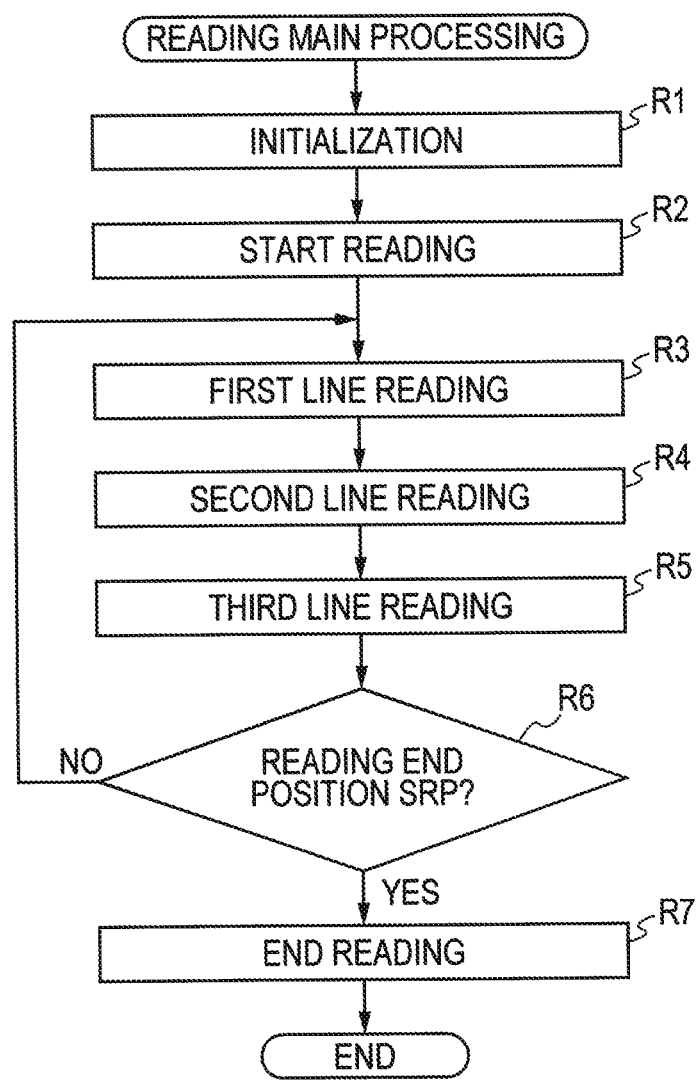
FIG. 9 is a flowchart showing reading main processing.

The reading main processing shown in FIG. 9 is started when the user places a document GS on the paper feed tray 2 and presses a reading start button of the operation interface 5. That is, in response to receiving a reading start command from the operation interface 5 when the front sensor 27 is ON, the CPU 40 starts the reading main processing.

The CPU 40 initializes the device controller 44, the AFE 45, the image processor 48, and so on (R1). Specifically, the CPU 40 sets setting values that are required in processing R3 to processing R5 for executing reading operations with resolution of 300 DPI in the main scanning direction MD and 300 DPI in the conveyance direction FD to the device controller 44, the AFE 45, and the image processor 48.

The CPU 40 starts reading operation of the document GS (R2). Specifically, the CPU 40 transmits a drive command to the driving circuit 47 for conveying the document GS such that the leading end of the document GS is located at a reading start position. When the document GS is conveyed and the leading end of document GS is located at the reading start position, the CPU 40 transmits the reading start signal RSS to the device controller 44 and the image processor 48. The reading start position is a position that is away toward the downstream side by a particular distance from the position of the rear sensor 29 along the conveyance direction FD. In this embodiment, the CPU 40 continues the operation of transmitting the drive command to the driving circuit 47 even after the leading end of the document GS is conveyed to the reading start position.

The CPU 40 executes the first line reading operation (R3). Specifically, the CPU 40 controls the light source 30 to emit light to the document GS in the sequence of green color, blue color, and red color, and controls the light receiver 31 to receive the reflection light. The CPU 40 controls the AFE 45 and the corrector 46 to convert analog signals that are outputted depending on the amount of received light into gradation values GV. The CPU 40 controls the image processor 48 to convert the converted gradation values GV of green color, blue color, and red color into the output color value OCV and to store the output color value OCV in the RAM 42, and acquires the stored output color value OCV.

The CPU 40 executes the second line reading operation (R4). Specifically, the CPU 40 controls the light source 30 to emit light to the document GS in the sequence of blue color, red color, and green color, and controls the light receiver 31 to receive the reflection light. The CPU 40 controls the AFE 45 and the corrector 46 to convert analog signals that are outputted depending on the amount of received light into gradation values GV. The CPU 40 controls the image processor 48 to convert the converted gradation values GV of blue color, red color, and green color into the output color value OCV and to store the output color value OCV in the RAM 42, and acquires the stored output color value OCV.

The CPU 40 executes the third line reading operation (R5). Specifically, the CPU 40 controls the light source 30 to emit light to the document GS in the sequence of red color, green color, and blue color, and controls the light receiver 31 to receive the reflection light. The CPU 40 controls the AFE 45 and the corrector 46 to convert analog signals that are outputted depending on the amount of received light into gradation values GV. The CPU 40 controls the image processor 48 to convert the converted gradation values GV of red color, green color, and blue color into the output color value OCV and to store the output color value OCV in the RAM 42, and acquires the stored output color value OCV.

The CPU 40 determines whether the document GS is conveyed by a particular distance from a time point when the rear sensor 29 becomes OFF (R6). Specifically, when the CPU 40 has transmitted a drive command for conveying the document GS by the particular distance from the time point when the rear sensor 29 becomes OFF (R6: Yes), the CPU 40 determines that the document GS is conveyed by the particular distance from the time point when the rear sensor 29 becomes OFF and proceeds to the processing R7. When the CPU 40 has not transmitted a drive command for conveying the document GS by the particular distance from the time point when the rear sensor 29 becomes OFF (R6: No), the CPU 40 determines that the document GS is not conveyed by the particular distance from the time point when the rear sensor 29 becomes OFF and returns to the processing R3. In this embodiment, the reading operation is executed by repeatedly executing the processing R3 to the processing R5.

The CPU 40 ends the reading operation of the document GS (R7). Specifically, the CPU 40 transmits a drive command to the driving circuit 47 for discharging the document GS onto the paper discharge tray 4. Upon ending the processing R7, the reading main processing ends.

Specific Example

A specific example of the image scanner 1 will be described while referring to FIG. 10. A process in which the gradation values GV are replaced will be described while referring to FIG. 10, in a case where the document GS changes from a white background color image to a black color image when blue color that is the second output color OC2 of the first line is turned on, and the document GS changes from a black color image to a white background color image when green color that is the second output color OC2 of the third line (downstream) is turned on. In this specific example, the gradation values GV at a particular position in the main scanning direction MD perpendicular to the conveyance direction FD will be described. First, a process will be described in which the image processor 48 determines that top color shift occurs at the first target color value TCV1, when the gradation value GV of the third line (upstream) is acquired as the second target color value TCV2 and the gradation value GV of the first line is acquired as the first target color value TCV1. Next, a process will be described in which the image processor 48 determines that bottom color shift occurs at the first target color value TCV1 when the gradation value GV of the third line (downstream) is acquired as the first target color value TCV1. In this specific example, the reader 24 reads the document GS in the sequence of the third line (upstream), the first line, the second line, and the third line (downstream).

The device controller 44 controls the light source 30 to emit, to a white color image of the document GS, light of red color that is the first turn-on color TOC1 of the third line (upstream), controls the light source 30 to emit, to a white color image of the document GS, light of green color that is the second turn-on color TOC2 of the third line (upstream), and controls the light source 30 to emit, to a white color image of the document GS, light of blue color that is the third turn-on color TOC3 of the third line (upstream).

The device controller 44 controls the light source 30 to emit, to a white color image of the document GS, light of green color that is the first turn-on color TOC1 of the first line, controls the light source 30 to emit, to a boundary image of white color and black color of the document GS, light of blue color that is the second turn-on color TOC2 of the first line, and controls the light source 30 to emit, to a black color image of the document GS, light of red color that is the third turn-on color TOC3 of the first line.

The corrector 46 transmits "255" to the image processor 48 as the gradation value GV of red color that is the first output color OC1 of the third line (upstream), transmits "255" to the image processor 48 as the gradation value GV of green color that is the second output color OC2 of the third line (upstream), and transmits "255" to the image processor 48 as the gradation value GV of blue color that is the third output color OC3 of the third line (upstream).

The corrector 46 transmits "255" to the image processor 48 as the gradation value GV of green color that is the first output color OC1 of the first line, transmits "128" to the image processor 48 as the gradation value GV of blue color that is the second output color OC2 of the first line, and transmits "0" to the image processor 48 as the gradation value GV of red color that is the third output color OC3 of the first line.

The data acquisition unit 53 acquires the gradation value GV of the third line (upstream) as the second target color value TCV2. That is, the data acquisition unit 53 acquires the gradation value GV of red color of "255", the gradation value GV of green color of "255", and the gradation value GV of blue color of "255" as the second target color value TCV2. The data acquisition unit 53 acquires the gradation value GV of the first line as the first target color value TCV1. That is, the data acquisition unit 53 acquires the gradation value GV of red color of "0", the gradation value GV of green color of "255", and the gradation value GV of blue color of "128" as the first target color value TCV1. Because, in the third line (upstream), top color shift does not occur, the gradation value GV does not indicate black color, and the top color shift flag TOFG is OFF, the determination switcher 54 transmits the first target color value TCV1 and the second target color value TCV2 to the top color shift determiner 55.

Because all the gradation values GV of red color, green color, and blue color in the second target color value TCV2 are larger than or equal to "224", the white determiner 551 of the top color shift determiner 55 determines that the second target color value TCV2 indicates white color, turns on the white flag WFG, and transmits the white flag WFG to the top color shift flag TOFG generator 553.

In response to receiving the line color number LCN of "21", the top color shift determination condition TODC determiner 559 transmits, to the top color shift determiner 55, the top color shift determination condition TODC that the gradation value GV of green color that is the first output color OC1 of the first line is larger than or equal to the first particular value and the gradation value GV of red color that is the third output color OC3 of the first line is smaller than or equal to the second particular value.

Because the gradation value GV of green color in the first target color value TCV1 is larger than or equal to "224" that is the first particular value and the gradation value GV of red color is smaller than or equal to "64" that is the second particular value, the color shift determiner 552 of the top color shift determiner 55 determines that the top color shift determination condition TODC is satisfied, turns on the color shift flag CGFG, and transmits the color shift flag CGFG to the top color shift flag TOFG generator 553.

In response to receiving the white flag WFG from the white determiner 551 and receiving the color shift flag CGFG from the color shift determiner 552, because both the white flag WFG and the color shift flag CGFG are ON, the top color shift flag TOFG generator 553 determines that the white flag WFG is ON and the color shift flag CGFG is ON, turns on the top color shift flag TOFG, and transmits the top color shift flag TOFG to the data memory 52 and the black replacing unit 56. In response to receiving the first target color value TCV1, the top color shift determiner 55 transmits the first target color value TCV1 to the black replacing unit 56.

Figure 10:
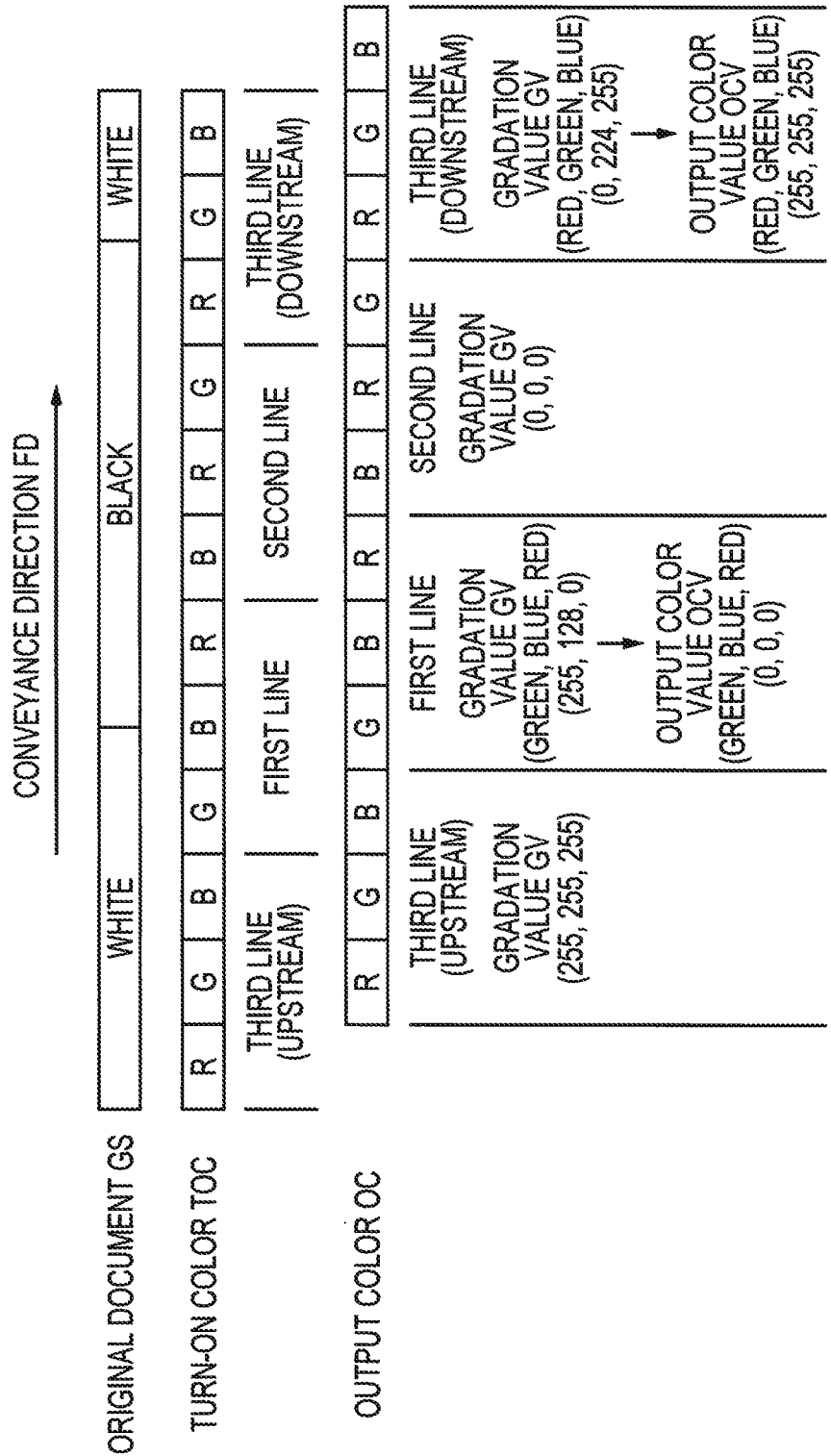
FIG. 10 is an explanatory diagram showing a process of replacing gradation values GV when reading a document GS including a boundary between a white color image and a black color image.

As shown in FIG. 10, in response to receiving the first target color value TCV1 and the top color shift flag TOFG, because the top color shift flag TOFG is ON, the black replacing unit 56 stores, in the RAM 42, a value indicative of black color in which all the gradation values GV of red color, green color, and blue color are "0", as the output color value OCV. The CPU 40 acquires the output color value OCV in the processing R3. In this way, it is determined that top color shift occurs at the gradation value GV of the first line that is the first target color value TCV1, and the gradation value GV of the first line is replaced with the output color value OCV indicative of black color.

A process will be described while referring to FIG. 10, in which the image processor 48 determines that bottom color shift occurs in the first target color value TCV1 when the first target color value TCV1 is the gradation value GV of the third line (downstream), in a case where the document GS changes from a black color image to a white background color image when green color that is the second output color OC of the third line (downstream) is turned on.

The device controller 44 controls the light source 30 to emit, to a black color image of the document GS, light of red color that is the first turn-on color TOC1 of the third line (downstream), controls the light source 30 to emit, to a boundary image of black color and white color of the document GS, light of green color that is the second turn-on color TOC2 of the third line (downstream), and controls the light source 30 to emit, to a white color image of the document GS, light of blue color that is the third turn-on color TOC3 of the third line (downstream).

The corrector 46 transmits "0" to the image processor 48 as the gradation value GV of red color that is the first output color OC1 of the third line (downstream), transmits "224" to the image processor 48 as the gradation value GV of green color that is the second output color OC2 of the third line (downstream), and transmits "255" to the image processor 48 as the gradation value GV of blue color that is the third output color OC3 of the third line (downstream).

The data acquisition unit 53 acquires the gradation value GV of the third line (downstream) as the first target color value TCV1. That is, the data acquisition unit 53 acquires the gradation value GV of red color of "0", the gradation value GV of green color of "224", and the gradation value GV of blue color of "255" as the first target color value TCV1. After top color shift occurs in the first line, the black determiner 57 determines that the gradation value GV of the second line indicates black color and the top color shift flag TOFG is ON, and hence the determination switcher 54 transmits the first target color value TCV1 to the black determiner 57.

Because the first target color value TCV1 does not indicate black color, the black determiner 57 transmits the first target color value TCV1 to the bottom color shift determiner 58, and also turns off the top color shift flag TOFG and transmits the top color shift flag TOFG to the data memory 52.

In response to receiving the line color number LCN of "11", the bottom color shift determination condition TADC determiner 579 transmits, to the bottom color shift determiner 58, the bottom color shift determination condition TADC that the gradation value GV of red color that is the first output color OC1 of the third line is smaller than or equal to the second particular value and the gradation value GV of blue color that is the third output color OC3 of the third line is larger than or equal to the first particular value.

Because the gradation value GV of red color in the first target color value TCV1 is smaller than or equal to "64" that is the second particular value and the gradation value GV of blue color is larger than or equal to "224" that is the first particular value, the bottom color shift determiner 58 determines that the bottom color shift determination condition TADC is satisfied. Thus, the bottom color shift determiner 58 turns on the bottom color shift flag TAFG and transmits the bottom color shift flag TAFG to the white replacing unit 59, and also transmits the first target color value TCV1 to the white replacing unit 59.

As shown in FIG. 10, in response to receiving the first target color value TCV1 and the bottom color shift flag TAFG, because the bottom color shift flag TAFG is ON, the white replacing unit 59 stores, in the RAM 42, a value indicative of white color in which all the gradation values GV of red color, green color, and blue color are "255" as the output color value OCV. The CPU 40 acquires the output color value OCV in the processing R5. In this way, the image processor 48 determines that bottom color shift occurs at the gradation value GV of the third line (downstream) that is the first target color value TCV1, and replaces the gradation value GV of the third line (downstream) with the output color value OCV indicative of white color.

Effects of the Embodiment

In response to receiving the line color number LCN of "11", "21", or "31" after receiving the memory completion flag WEFG, the data acquisition unit 53 acquires the top color shift flag TOFG, transmits the acquired top color shift flag TOFG to the determination switcher 54, acquires the first gradation value GV1, the second gradation value GV2, the third gradation value GV3, the first color C1, the second color C2, and the third color C3, transmits the acquired values to the determination switcher 54 as the second target color value TCV2, acquires the fourth gradation value GV4, the fifth gradation value GV5, the sixth gradation value GV6, the fourth color C4, the fifth color C5, and the sixth color C6, and transmits the acquired values to the determination switcher 54 as the first target color value TCV1. In response to receiving the top color shift flag TOFG, the first target color value TCV1, and the second target color value TCV2, the determination switcher 54 transmits the first target color value TCV1 and the second target color value TCV2 to the top color shift determiner 55 when the top color shift flag TOFG is not ON, and transmits the first target color value TCV1 to the black determiner 57 when the top color shift flag TOFG is ON.

In response to receiving the first target color value TCV1, the top color shift determiner 55 transmits the received first target color value TCV1 to the black replacing unit 56. In response to receiving the second target color value TCV2, when the received second target color value TCV2 indicates white color, the white determiner 551 included in the top color shift determiner 55 turns on the white flag WFG and transmits the white flag WFG to the top color shift flag TOFG generator 553. When the received second target color value TCV2 does not indicate white color, the white determiner 551 turns off the white flag WFG and transmits the white flag WFG to the top color shift flag TOFG generator 553. In response to receiving the first target color value TCV1, when the received first target color value TCV1 satisfies the top color shift determination condition TODC, the color shift determiner 552 included in the top color shift determiner 55 turns on the color shift flag CGFG and transmits the color shift flag CGFG to the top color shift flag TOFG generator 553. When the received first target color value TCV1 does not satisfy the top color shift determination condition TODC, the color shift determiner 552 turns off the color shift flag CGFG and transmits the color shift flag CGFG to the top color shift flag TOFG generator 553. In response to receiving the white flag WFG and the color shift flag CGFG, when the white flag WFG is ON and the color shift flag CGFG is ON, the top color shift flag TOFG generator 553 turns on the top color shift flag TOFG and transmits the top color shift flag TOFG to the black replacing unit 56. In other cases, the top color shift flag TOFG generator 553 turns off the top color shift flag TOFG and transmits the top color shift flag TOFG to the black replacing unit 56. In response to receiving the first target color value TCV1 and the top color shift flag TOFG, when the received top color shift flag TOFG is ON, the black replacing unit 56 stores, in the RAM 42, a color value indicative of black color as the output color value OCV. When the received top color shift flag TOFG is OFF, the black replacing unit 56 stores the first target color value TCV1 in the RAM 42 as the output color value OCV.

In response to receiving the first target color value TCV1, when the received first target color value TCV1 indicates black color, the black determiner 57 stores the first target color value TCV1 in the RAM 42 as the output color value OCV. When the received first target color value TCV1 does not indicate black color, the black determiner 57 transmits the first target color value TCV1 to the bottom color shift determiner 58. In response to receiving the first target color value TCV1, when the received first target color value TCV1 satisfies the bottom color shift determination condition TADC, the bottom color shift determiner 58 turns on the bottom color shift flag TAFG and transmits the bottom color shift flag TAFG to the white replacing unit 59, and also transmits the first target color value TCV1 to the white replacing unit 59. When the received first target color value TCV1 does not satisfy the bottom color shift determination condition TADC, the bottom color shift determiner 58 turns off the bottom color shift flag TAFG and transmits the bottom color shift flag TAFG to the white replacing unit 59, and also transmits the first target color value TCV1 to the white replacing unit 59. In response to receiving the bottom color shift flag TAFG and the first target color value TCV1, when the received bottom color shift flag TAFG is ON, the white replacing unit 59 stores a color value indicative of white color in the RAM 42 as the output color value OCV. When the received bottom color shift flag TAFG is OFF, the white replacing unit 59 stores the first target color value TCV1 in the RAM 42 as the output color value OCV. In this way, when top color shift occurs, the black replacing unit 56 stores a value indicative of black color in the RAM 42 as the output color value OCV. And, when bottom color shift occurs, the white replacing unit 59 stores a value indicative of white color in the RAM 42 as the output color value OCV. Thus, color shift can be removed depending on the type of the color shift.

In the above-described embodiment, the top color shift determiner 55 determines that top color shift occurs in the first target color value TCV1 when it is determined that the first target color value TCV1 indicates top color shift and that the second target color value TCV2 is gradation data of white color. Thus, top color shift can be determined accurately.

In the above-described embodiment, the determination switcher 54 transmits gradation data to the bottom color shift determiner 58 through the black determiner 57 only when it is determined that top color shift occurs or it is determined that gradation data of black color follows after it is determined that top color shift occurs. Thus, bottom color shift can be determined accurately.

In the above-described embodiment, the sequence of turning on three colors of the light source 30 is all different in the first line reading operation (R3), the second line reading operation (R4), and the third line reading operation (R5). Specifically, the first turn-on colors TOC1 in the first line reading operation (R3), the second line reading operation (R4), and the third line reading operation (R5) are all different. The second turn-on colors TOC2 in the first line reading operation (R3), the second line reading operation (R4), and the third line reading operation (R5) are all different. The third turn-on colors TOC3 in the first line reading operation (R3), the second line reading operation (R4), and the third line reading operation (R5) are all different. Thus, the top-color-shift color (the first turn-on color TOC1) and the bottom-color-shift color (the third turn-on color TOC3) change at every line. Thus, even when replacement of gradation values is unsuccessful for some reason, a color shift does not tend to stand out.

The image scanner 1 is a non-limiting example of an image scanner. The light source 30, the light receiver 31, and the device controller 44 are non-limiting examples of a light source, a line sensor, and a light source controller. The driving circuit 47, the conveyance motor MT, the paper feed roller 21, and the conveyance rollers 23, 26 are a non-limiting example of a position changer. The AFE 45 and the corrector 46 are a non-limiting example of a reader. The top color shift determiner 55 is a non-limiting example of a top color shift determiner. The black replacing unit 56 is a non-limiting example of a top replacing unit. The bottom color shift determiner 58 and the black determiner 57 are a non-limiting example of a bottom color shift determiner. The white replacing unit 59 is a non-limiting example of a bottom replacing unit.

The black determiner 57 is a non-limiting example of a black determiner. The determination switcher 54 is a non-limiting example of a switch transmitter. The data memory 52 is a non-limiting example of a data memory. The white determiner 551 and the color shift determiner 552 are non-limiting examples of a white determiner and a top color determiner.

While the disclosure has been described in detail with reference to the above aspects thereof, it would be apparent to those skilled in the art that various changes and modifications may be made therein without departing from the scope of the claims. Examples are provided below.

(1) For example, the image scanner 1 may be applied to a multi-function peripheral that includes a printer unit. Further, in the above-described embodiments, one reader 24 is provided. Alternatively, two readers may be provided in order to read both sides of a document GS.

(2) In the above-described embodiment, the image scanner 1 is configured to convey and read a document GS (an ADF type scanner). The image scanner 1 may be configured in another way. For example, a reader may be configured to move to read the document GS supported on a transparent document table (a flatbed type scanner). In this case, a moving mechanism of the reader serves as a position changer.

(3) In the above-described embodiment, the reader 24 is a reader of a non-magnification optical system that uses the rod lens array 32. Alternatively, the reader 24 may be a reader of a reduction optical system. In this case, the reader of the reduction optical system performs a color reading operation by sequentially switching between red, green, and blue light.

(4) In the above-described embodiment, the top color shift determiner 55 determines whether top color shift occurs in the first target color value TCV1 by determining whether the top color shift determination condition TODC is satisfied that the gradation value GV of the first output color OC1 is larger than or equal to the first particular value and the gradation value GV of the third output color OC3 is smaller than or equal to the second particular value. Alternatively, another condition may be used. For example, the condition may be for determining whether the gradation value GV of the first output color OC1 indicates a white color image (for example, 255 in case of 8 bits) and whether the gradation value GV of the third output color OC3 indicates a black color image (for example, 0).

(5) In the above-described embodiment, the bottom color shift determiner 58 determines whether bottom color shift occurs in the first target color value TCV1 by determining whether the bottom color shift determination condition TADC is satisfied that the gradation value GV of the first output color OC1 is smaller than or equal to the second particular value and the gradation value GV of the third output color OC3 is larger than or equal to the first particular value. Alternatively, another condition may be used. For example, the condition may be for determining whether the gradation value GV of the first output color OC1 indicates a black color image (for example, 0) and whether the gradation value GV of the third output color OC3 indicates a white color image (for example, 255 in case of 8 bits).

(6) In the above-described embodiment, the first turn-on color TOC1, the second turn-on color TOC2, and the third turn-on color TOC3 are different colors from one another in each line of the first line, the second line, and the third line. Alternatively, another method may be used. For example, the light source 30 may be always turned on in the turn-on sequence of the first turn-on color TOC1, the second turn-on color TOC2, and the third turn-on color TOC3 of the first line. Or, the light source 30 may be always turned on in the turn-on sequence of the first turn-on color TOC1, the second turn-on color TOC2, and the third turn-on color TOC3 of the second line. Or, the light source 30 may be always turned on in the turn-on sequence of the first turn-on color TOC1, the second turn-on color TOC2, and the third turn-on color TOC3 of the third line.

(7) In the above-described embodiment, the top color shift determiner 55 determines whether top color shift occurs based on the first particular value and the second particular value, and the bottom color shift determiner 58 determines whether bottom color shift occurs based on the first particular value and the second particular value. Alternatively, other values may be used. For example, the top color shift determiner 55 may determine whether top color shift occurs based on a third particular value and a fourth particular value, and the bottom color shift determiner 58 may determine whether bottom color shift occurs based on a fifth particular value and a sixth particular value. That is, the top color shift determiner 55 and the bottom color shift determiner 58 may use different threshold values.

What is claimed is:

1. An image scanner comprising:
   a light source configured to emit light of each of three colors of red, blue, and green;
   a line sensor configured to read an image, on a document, of one line along a first direction;
   a position changer configured to change a reading position in a second direction perpendicular to the first direction, the reading position being a position of the image of one line that is read by the line sensor; and
   a circuit configured to:
      while changing the reading position by the position changer and sequentially emitting light of each of the three colors in a turn-on sequence from the light source to the document, control the line sensor to read reflection light of the emitted light, thereby acquiring gradation image data including gradation values of the three colors for each pixel in one line;
      determine whether a top color shift occurs in the gradation image data at a determination position that is a position of a particular pixel in one line, the top color shift being caused by a change of an image to be read, in the second direction, from a white image to a black image;
      in response to determining that the top color shift occurs at the determination position, replace gradation image data at the determination position with black image data;
      determine whether a bottom color shift occurs in the gradation image data at the determination position, the bottom color shift being caused by a change of an image to be read, in the second direction, from a black image to a white image; and
      in response to determining that the bottom color shift occurs at the determination position, replace gradation image data at the determination position with white image data.

2. The image scanner according to claim 1, further comprising a data memory configured to store first gradation image data and second gradation image data, the second gradation image data being gradation image data of a previous line of a line corresponding to the first gradation image data,
   wherein the circuit is configured to:
      determine whether the second gradation image data at the determination position indicates white color;
      determine whether the first gradation image data at the determination position indicates a top-color-shift color in which a gradation value of a first color in the turn-on sequence is larger than or equal to a white threshold value and a gradation value of a third color in the turn-on sequence is smaller than or equal to a black threshold value;
      in response to determining that the first gradation image data indicates the top-color-shift color and determining that the second gradation image data indicates white color, determine that the top color shift occurs in the first gradation image data at the determination position; and
      in response to determining that the first gradation image data indicates color other than the top-color-shift color or in response to determining that the second gradation image data indicates color other than white color, determine that the top color shift does not occur in the first gradation image data at the determination position.

3. The image scanner according to claim 2, wherein the circuit is configured to:
   determine whether the first gradation image data indicates black color at the determination position;
   in response to determining that the first gradation image data indicates color other than black color, determine whether the first gradation image data at the determination position indicates a bottom-color-shift color in which a gradation value of a first color in the turn-on sequence is smaller than or equal to the black threshold value and a gradation value of a third color in the turn-on sequence is larger than or equal to the white threshold value;
   in response to determining that the first gradation image data indicates black color or in response to determining that the first gradation image data indicates color other than the bottom-color-shift color, determine that the bottom color shift does not occur in the first gradation image data at the determination position; and
   in response to determining that the first gradation image data indicates the bottom-color-shift color, determine that the bottom color shift occurs in the first gradation image data at the determination position.

4. The image scanner according to claim 3, wherein the circuit is configured to:
   in response to determining that the top color shift occurs or in response to determining that the first gradation image data indicates black color after it is determined that the top color shift occurs, determine whether the bottom color shift occurs in gradation image data at a subsequent determination position in a subsequent line of a line corresponding to the first gradation image data, the subsequent determination position being at a same position as the determination position with respect to the first direction; and
   in response to determining that the top color shift does not occur or in response to determining that the first gradation image data indicates color other than black color after it is determined that the top color shift occurs, determine whether the top color shift occurs in the gradation image data at the subsequent determination position.

5. The image scanner according to claim 2, wherein the circuit is configured to:
   control the light source to emit light to a document in a first turn-on sequence and control the line sensor to read reflection light of the emitted light, thereby acquiring the second gradation image data; and
   control the light source to emit light to the document in a second turn-on sequence and control the line sensor to read reflection light of the emitted light, thereby acquiring the first gradation image data; and
   wherein a sequence of the three colors in the first turn-on sequence is all different from a sequence of the three colors in the second turn-on sequence, a first color in the first turn-on sequence being different from a first color in the second turn-on sequence, a second color in the first turn-on sequence being different from a second color in the second turn-on sequence, and a third color in the first turn-on sequence being different from a third color in the second turn-on sequence.

6. An image scanner comprising:
a light source configured to emit light of each of three colors of red, blue, and green;
a light source controller configured to control the light source to sequentially emit light of each of the three colors in a turn-on sequence;
a line sensor configured to read an image, on a document, of one line along a first direction;
a position changer configured to change a reading position in a second direction perpendicular to the first direction, the reading position being a position of the image of one line that is read by the line sensor;
a reader configured to, while changing the reading position by the position changer and emitting light from the light source to the document in the turn-on sequence, cause the line sensor to read reflection light of the emitted light, thereby acquiring gradation image data including gradation values of the three colors for each pixel in one line;
a top color shift determiner configured to determine whether a top color shift occurs in the gradation image data at a determination position that is a position of a particular pixel in one line, the top color shift being caused by a change of an image to be read, in the second direction, from a white image to a black image;
a top replacing unit configured to, in response to determining that the top color shift occurs at the determination position, replace gradation image data at the determination position with black image data;
a bottom color shift determiner configured to determine whether a bottom color shift occurs in the gradation image data at the determination position, the bottom color shift being caused by a change of an image to be read, in the second direction, from a black image to a white image; and
a bottom replacing unit configured to, in response to determining that the bottom color shift occurs at the determination position, replace gradation image data at the determination position with white image data.

7. The image scanner according to claim 6, wherein the bottom color shift determiner comprises a black determiner configured to determine whether the gradation image data indicates black color at the determination position; and
wherein the bottom color shift determiner is configured to:
in response to determining that the gradation image data indicates color other than black color, determine whether the gradation image data at the determination position indicates a bottom-color-shift color in which a gradation value of a first color in the turn-on sequence is smaller than or equal to a black threshold value and a gradation value of a third color in the turn-on sequence is larger than or equal to a white threshold value;
in response to determining that the gradation image data indicates black color or in response to determining that the gradation image data indicates color other than the bottom-color-shift color, determine that the bottom color shift does not occur in the gradation image data at the determination position; and
in response to determining that the gradation image data indicates the bottom-color-shift color, determine that the bottom color shift occurs in the gradation image data at the determination position.

8. The image scanner according to claim 7, further comprising a switch transmitter configured to switch whether to transmit the gradation image data to the top color shift determiner or to transmit the gradation image data to the bottom color shift determiner;
wherein the switch transmitter is configured to:
in response to determining by the top color shift determiner that the top color shift occurs or in response to determining by the black determiner that the gradation image data indicates black color after the top color shift determiner determines that the top color shift occurs, transmit, to the bottom color shift determiner, subsequent gradation image data that is acquired by the reader at a subsequent determination position in a subsequent line of a line corresponding to the gradation image data, the subsequent determination position being at a same position as the determination position with respect to the first direction; and
in response to determining by the top color shift determiner that the top color shift does not occur or in response to determining by the black determiner that the gradation image data indicates color other than black color after the top color shift determiner determines that the top color shift occurs, transmit the subsequent gradation image data to the top color shift determiner.

9. The image scanner according to claim 8, further comprising a data memory configured to store first gradation image data and second gradation image data, the second gradation image data being gradation image data of a previous line of a line corresponding to the first gradation image data,
wherein the switch transmitter is configured to switch whether to transmit the first gradation image data and the second gradation image data stored in the data memory to the top color shift determiner or to transmit the first gradation image data stored in the data memory to the bottom color shift determiner;
wherein the top color shift determiner comprises:
a white determiner configured to determine whether the second gradation image data at the determination position indicates white color; and
a top color determiner configured to determine whether the first gradation image data at the determination position indicates a top-color-shift color in which a gradation value of a first color in the turn-on sequence is larger than or equal to the white threshold value and a gradation value of a third color in the turn-on sequence is smaller than or equal to the black threshold value; and
wherein the top color shift determiner is configured to:
in response to determining by the top color determiner that the first gradation image data indicates the top-color-shift color and in response to determining by the white determiner that the second gradation image data indicates white color, determine that the top color shift occurs in the first gradation image data at the determination position; and in response to determining by the top color determiner that the first gradation image data indicates color other than the top-color-shift color or in response to determining by the white determiner that the second gradation image data indicates color other than white color, determine that the top color shift does not occur in the first gradation image data at the determination position.

10. The image scanner according to claim 9, wherein the light source controller is configured to:
control the light source to emit light to a document in a first turn-on sequence and controls the line sensor to read reflection light of the emitted light, thereby acquiring the second gradation image data; and
control the light source to emit light to the document in a second turn-on sequence and controls the line sensor to read reflection light of the emitted light, thereby acquiring the first gradation image data; and
wherein a sequence of the three colors in the first turn-on sequence is all different from a sequence of the three colors in the second turn-on sequence, a first color in the first turn-on sequence being different from a first color in the second turn-on sequence, a second color in the first turn-on sequence being different from a second color in the second turn-on sequence, and a third color in the first turn-on sequence being different from a third color in the second turn-on sequence.

* * * * *